United States Patent

[11] 3,614,322

[72] Inventors David L. Joslow
Chester;
John J. Bosnak, Old Saybrook, both of Conn.

[21] Appl. No. 859,914
[22] Filed Sept. 22, 1969
[45] Patented Oct. 19, 1971
[73] Assignee Chester Electronic Laboratories, Inc.
Chester, Conn.

[54] SYSTEM FOR SELECTING AND REPRODUCING PERCEPTIBLE PROGRAMS
25 Claims, 11 Drawing Figs.

[52] U.S. Cl. .................................................... 179/1 B, 179/18 E, 35/35 C
[51] Int. Cl. .................................................... G09b 5/04
[50] Field of Search .......................................... 179/1 B, 18 E

[56] References Cited
UNITED STATES PATENTS

| | | | |
|---|---|---|---|
| 3,502,816 | 3/1970 | Gerke et al. ................. | 179/18 E |
| 3,508,001 | 4/1970 | Hoover......................... | 179/1 B |

*Primary Examiner*—Kathleen H. Claffy
*Assistant Examiner*—Douglas W. Olms
*Attorneys*—Norman J. O'Malley and Theodore Jay, Jr.

ABSTRACT: A system for selecting and reproducing audio, video, or other humanly perceptible programs comprises a program source providing a multiplicity of program signals, a plurality of stations at which individual programs may be reproduced, a switching mechanism for selectively connecting selected program signals to the reproducing means at each station, and manually operable means at each station for controlling the switching mechanism. The switching mechanism includes one or more crossbar switches and a plurality of relay trees so as to provide a hard-wired connection between the reproducing means and the program source for each selected program signal. The manually operable means for controlling the switching mechanism consists of a touch tone pad at each station, and the design of the system is such as to utilize solid-state components to a high degree.

PATENTED OCT 19 1971 3,614,322

SHEET 1 OF 9

INVENTORS
DAVID L. JOSLOW
JOHN J. BOSNAK

BY
McCormick, Paulding & Huber
Attorneys

SYSTEM FOR SELECTING AND REPRODUCING PERCEPTIBLE PROGRAMS

BACKGROUND OF THE INVENTION

This invention relates to a system for supplying a plurality of students or other persons located at a plurality of individual stations with perceptible programs, with the person at each station being capable of selecting, from a plurality of programs available from a remote source, programs to be received and reproduced at such station by manipulating a touch tone pad or similar mechanism at the station, and deals more particularly with such a system wherein the selecting mechanism includes several parts which are usable in common by the several stations and which are exclusively assigned to one station during a program selection process carried out by manipulating the selecting mechanism at such station, and which are thereafter freed for use with other stations.

The system of this invention may be put to use in many different applications wherein it is desired to make a selection or perceptible programs available at a plurality of different stations. One such application involves the use of the system as an educational device in a school or group of schools for providing educational programs in audio or video form to a plurality of students at student booths or work areas. Such devices are finding increasing use for the teaching of languages, music, history and a wide range of other subjects, and in such an application are sometimes referred to "learning laboratories," "language laboratories" or "teaching machines." For the purpose of the description which follows the system is described as applied to such an educational situation, and is more particularly described as one wherein audio programs are supplied to a plurality of student booths. It should be understood, however, that the system of the invention is by no means limited to audio programs or to educational situations and, instead, may be used with video programs or other environments. and in other environments.

The system of this invention is in many respects similar to the system disclosed in U.S. Pat. No. 3,199,226 for Teaching Machine, and is an improvement thereon. Among the results of the improvements effected by the system of this invention are faster program selection, easier operation by the persons making the program selection, greater reliability, increased capacity and increased facility for adding additional program capacity, simplified manufacture and maintenance, and reduction in the space required for the switching equipment.

SUMMARY OF THE INVENTION

The invention resides in a system for selecting and reproducing perceptible programs, such as audio and video programs, available from a remote source, and which system includes a touch-tone pad for producing coded tone signals, signal converting means for converting the tone signals to binary signals, a switching means responsive to the binary signals from the signal converting means for connecting a selected program signal to the reproducing means of a calling station, and a line finder means for exclusively assigning the signal converting means to a calling station during the program selection process carried out at such station. The invention further resides in the particular construction of the line finder and the associated means for controlling its operation and in the construction of various parts of the switching means and the means for controlling it in response to the program selecting signals produced at the remote stations.

BRIEF DESCRIPTION OF THE DRAWINGS

FIGS. 1A and 1B taken together constitute a block diagram showing the general arrangement and construction of a system embodying this invention.

FIG. 4 is a diagram showing the manner in which FIGS. 1A and 1B are to be joined to form a complete diagram.

FIG. 5 is a diagram showing the manner in which FIGS. 2A to 2F are to be joined to form a complete diagram.

DETAILED DESCRIPTION OF THE PREFERRED EMBODIMENT

Figures 1A, 4:
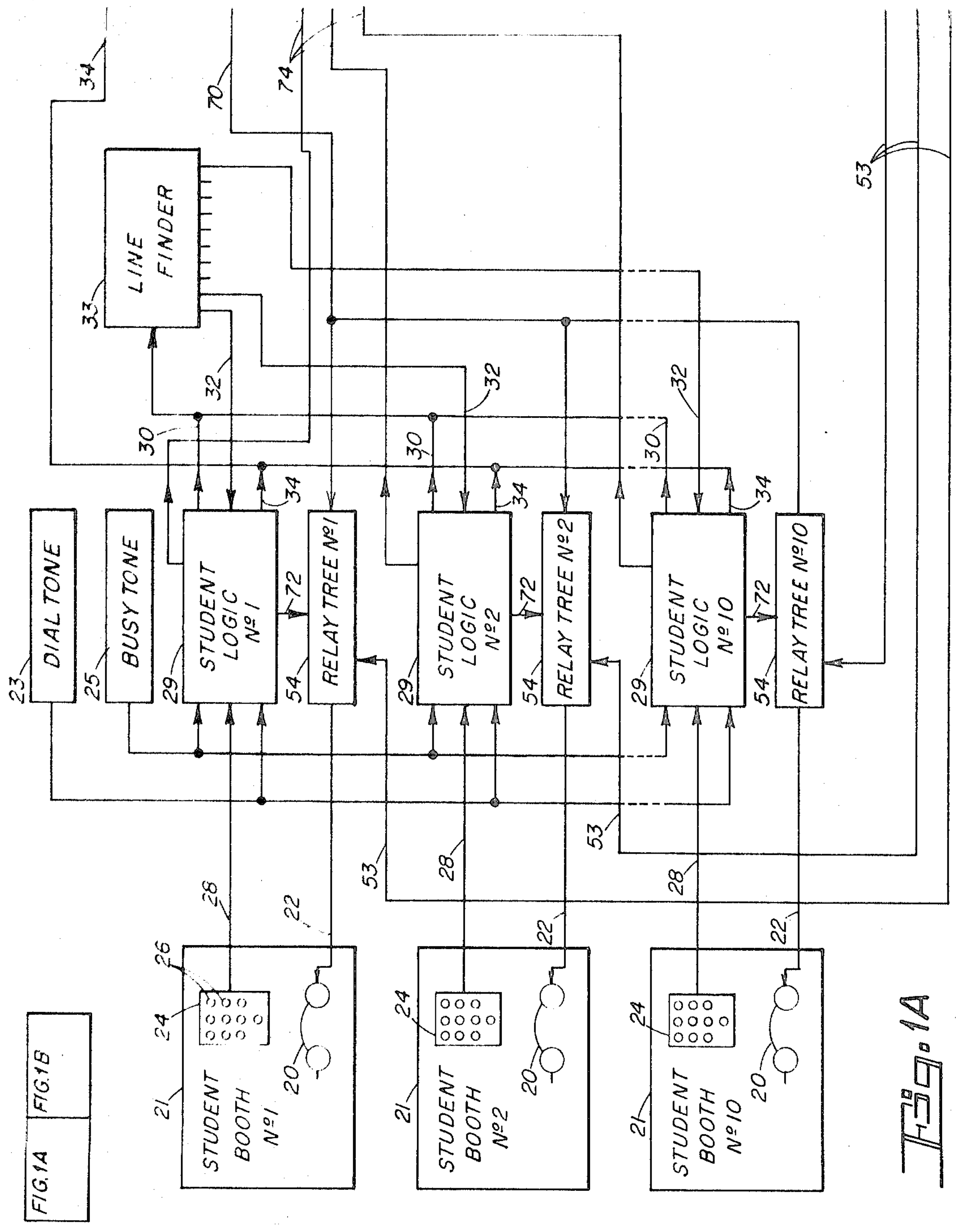
Figure 5:
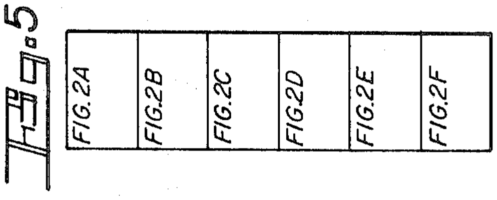
Figure 1B:
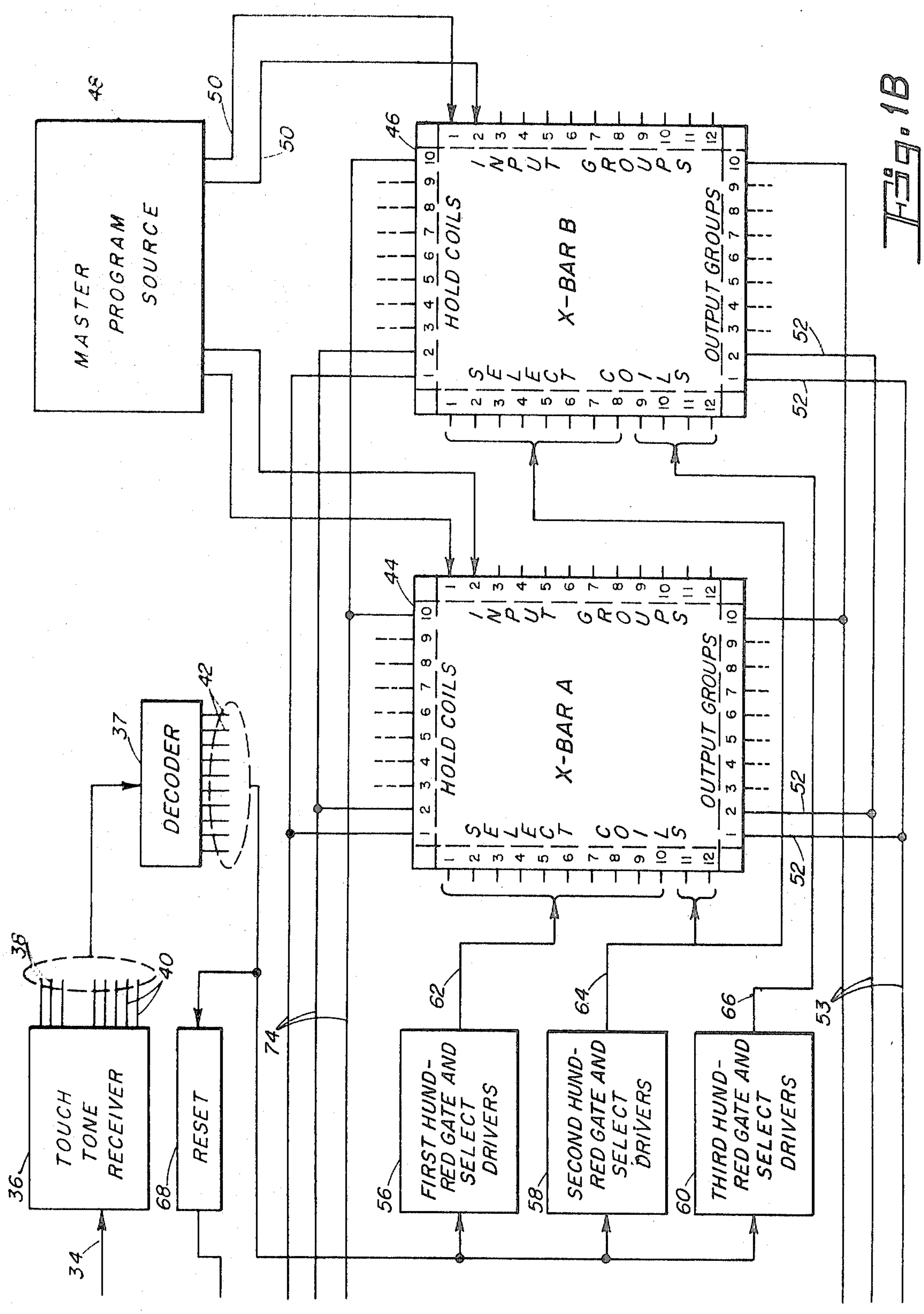

General Arrangement of the System—FIGS. 1A and 1B

FIGS. 1A and 1B taken together form a single diagram showing the general arrangement of a system embodying this invention. Referring now to this diagram, the system illustrated thereby is one intended for use in a school and which includes a number of stations in the form of student booths 21, 21 at which perceptible programs are to be reproduced for presentation to one or more students working at the booths. The illustrated system includes 10 such booths, but for the purpose of clarity only three such booths are shown, these being identified as student booth No. 1, student booth No. 2 and student booth No. 10. The system is further one adapted to provide audio programs to the student booths and, therefore, each student booth includes a reproducer, in the form of a pair of headphones 20 for converting a received program signal transmitted thereto over the associate line 22 to a perceptible audio program. Each student booth further includes a mechanism, operable by the student at the booth, for making a program selection and for otherwise controlling the associated parts of the system as hereinafter described in more detail, and in the illustrated case, this mechanism constitutes a touch-tone pad 24 at each student booth.

Each touch-tone pad 24 is or may be of a conventional construction similar to that used in touch-tone telephone exchange systems. More particularly it includes 10 buttons 26, 26, numbered zero through nine, and an associated tone generator located within the same housing as the buttons. Upon the actuation of any one of the buttons 26, 26, the associated tone generator operates to produce a pair of coded tone signals, which appear on the associated output line 28 and which distinctly represents the actuated button. That is, as shown in FIG. 1A, the buttons 26, 26 of each touch-tone pad are arranged in three vertical columns and four horizontal rows. The tone generator is capable of producing three distinct high frequencies, for example, 1,209 Hz., 1,336 Hz. and 1,477 Hz., each of which is assigned to a respective one of the three vertical columns. Also, the tone generator is capable of producing four separate lower frequencies, such as 697 Hz., 770 Hz., 852 Hz. and 941 Hz., each of which is assigned to a respective one of the four horizontal rows. When any one of the buttons is actuated, the pair of coded tone signals produced as a result thereof on the associated output line 28 consists of one of the three high frequency tones and one of the four low frequency tones.

By manipulating the buttons 26, 26 of each touch-tone pad 24, the student at the associated booth may select any one of a large number of available program signals for connection to and reproduction through the associated pair of headphones 20. A complete program cycle includes three stages of manipulation on the part of the student. The first stage involves that of gaining access to the common switching equipment so that a program selection may subsequently be made. The second stage involves that of making the program selection, and the third stage involves that of releasing the connection with the received program and conditioning the equipment for a new program cycle. In the illustrated system all three stages of the program cycle are controlled by the student through the manipulation of his touch-tone pad 24. It is to be understood, however, that this is not entirely necessary in accordance with the broader aspects of the invention, and in some cases the touch-tone pad 24 may be used only for the program selecting stage or for the program selecting stage plus one of the other two stages, with a separate button or switch being provided to control the stages not controlled directly from the touch-tone pad.

Included in the system are a plurality of student logic units 29, 29 each exclusively associated with a respective one of the student booths, and associated with all of the student logics is a single line finder 33. The student logics 29, 29 and the line finder 33 together control the access of the Touch-Tone pads to the parts of the switching equipment which are common to all student booths. At the start of a program cycle for one booth, one of the buttons of the associated touch-tone pad is actuated by pushing it and the tone signals produced as a result thereof are transmitted over the associated line 28 to the associated student logic 29 which responds to them and produces a program call signal transmitted to the line finder over the associated output line 30. In response to the receipt of a call signal the line finder in turn is started into operation and stops when set in a condition representing the calling booth or some other calling booth which may have been producing a call signal at the same time. When the line finder does stop on a calling booth, a signal representing this is transmitted to the associated student logic over the line 32 and this in turn conditions the student logic to cause subsequent coded dial tones produced by the associated touch-tone pad 24 to be transmitted to the common switching equipment through the associated output line 34. A dial tone generator 23 and a busy tone generator 25 are also provided and produce signals transmitted to the headphones 20 of a student booth at proper times during a program selection process to indicate when the common switching equipment is ready to accept program selecting signals from the associated touch-tone pad.

The common switching equipment, as illustrated in FIG. 1B, includes a signal converting means for converting the pairs of coded tone signals received thereby into binary coded voltage signals for operating the moving parts of the switching apparatus. This signal converting means, in turn, comprises a touch-tone receiver 36 and a decoder 37. The touch-tone receiver 36 receives the pairs of coded tone signals transmitted thereto over the line 34 and has seven output lines 38, 38, and 40, 40 each associated with a respective one of the seven different frequencies produced by the tone generator of each touch-tone pad 24. Whenever a particular frequency appears on the input line 34, an output pulse is produced on the corresponding one of the output lines 38, 38 and 40, 40. The three output lines 38, 38 represent those assigned to the three higher frequencies of the touch-tone pad generators and the output lines 40, 40 represent the four lines assigned to the four lower frequencies of the Touch-Tone pad generators. The touch-tone receiver 36 may be of a generally conventional construction and for example, may comprise a high band-pass filter, amplifier and tone separator for the three high frequencies and a low band-pass filter, amplifier and tone separator for lower frequencies, a gate circuit operable to produce an output pulse in response to each tone detected by the high frequency tone separator, and a similar gate circuit for producing an output pulse in response to each frequency detected by the low frequency tone separator. It also preferably includes a delay circuit operable to prevent the production of any output pulses in response to tone signals which do not persist for a predetermined duration, for example 20 ms., so as to thereby reject spurious transient signals. The duration of the output pulses produced by the Touch-Tone receiver may vary, but are preferably on the order of about 40 ms. duration.

The output pulses produced by the touch-tone receiver 36 are transmitted to the decoder 37 which operates to convert the received pairs of pulses into a binary voltage signal appearing on one of 10 output lines 42, 42. Each line 42 represents a given one of the buttons of any one touch-tone pad, and the operation of the decoder is such that the binary voltage signal produced thereby is applied to that one of the lines 42, 42 which represents the particular button of a touch-tone pad pressed to produce such tones. The action therefore is such that each of the time one button is pushed on the touch-tone pad connected to the touch-tone receiver through the action of the line finder 33, a binary voltage signal is produced on the corresponding one of the lines 42, 42 of the decoder. This binary voltage signal is a pulse of a duration similar to that of the duration of the pulses appearing on the output lines of the Touch-Tone receiver, for example about 40 ms.

In the illustrated system, the apparatus which performs the actual switching or contact closing function to connect a selected program signal to a pair of headphones in hard-wired fashion includes two crossbar switches 44 and 46, indicated as X-bar A and X-bar B, which are connected to a master program source 48 and which, in the design thereof illustrated, together provide a program capacity of up to 240 programs. It should be understood, however, that the invention is not limited to this number of crossbar switches and that the program capacity of the system could be reduced by using only one crossbar switch or increased by adding additional crossbar switches, the additional switches being connected into the system in accordance with the same scheme as that shown for the two illustrated crossbar switches 44 and 46.

The master program source 48 is one which makes available a large number of program signals that may be individually reproduced to provide audio, video or other perceptible programs. The actual nature of the programs source may vary widely and may, for example, constitute a large bank of audio and/or video tape recorders, turntables, magnetic drum recorders, television cameras, microphones, file strip scanner, radio receiver, and/or television receivers. These devices of the master program source which produce the master program signals may be continuously running or may be adapted to be set in operation as soon as a demand is made for the associated program signal. For the sake of clarity, however, such starting means is omitted from FIG. 1B and instead the illustrated system is or may be considered one wherein the master program source has its individual devices operating continuously to continuously make available all of the program signals. The program signal produced by the master program source 48 appear on output lines illustrated at 50, 50. Actually, each of the illustrated lines 50, 50 is a cable consisting of 10 separate conductors on each of which appears a separate program signal. That is, each of the illustrated lines 50, 50 handles a group of 10 separate programs.

Each of the crossbar switches 44, 46 is or may be substantially identical to that shown and described in the aforementioned U.S. Pat. No. 3,199,226. More particularly, each switch 44 and 46 is one having 10 hold columns and 12 select levels. It is further one having ten sets of contacts for each cross-point. As will be well understood to those familiar with the crossbar switches, each switch includes a hold coil for each hold column and a select coil for each select level. A cross-point is defined by the intersection of one hold column and one select level so that there are 120 cross-points for each of the illustrated switches. In order to make or close the contacts at a cross-point, the associated select level coil is first energized and then the associated hold column coil is energized. As soon as the hold coil is energized, the contacts of the cross-point are made and thereafter the select level coil may be deenergized and the contacts of the cross-point will remain made for so long as the hold coil is maintained in an energized condition. Thus, after the contacts of one cross-point of one hold column have been made and the associated select coil released the contacts of other cross-point of other hold columns may thereafter be made without breaking the contacts of the first cross-point.

Still referring to the crossbar switches 44 and 46 of FIG. 1B, each hold column has a group of 10 output conductors each of which group of output conductors is for convenience represented by a singe line 52. When one of the cross-points of a hold column is actuated, 10 available program signals from the master program source 48 are connected in one to one relationship to the 10 conductors of the associated output line 52 of that particular hold column. For example, in FIG. 1B, the various input groups of master program signals to each crossbar switch are numbered one to 12 in correspondence with the numbers applied to the associated select coils. Likewise, the output groups of conductors have been numbered one to 10 in correspondence with the numbers applied to the associated hold coils. If in one of the switches the cross-point represented by select coil one and hold coil one is actuated, then the number one input group of program signals will appear on the number one output group of conductors. Likewise, if the cross-point represented by the number six select coil and the number five hold coil is actuated, then the number six input group of program signals will appear on the number five output group of conductors.

EaCh hold column of each crossbar switch comprises part of a switching mechanism exclusively assigned to a corresponding one of the student booths 21, 21. That is, the number one hold columns of both of the crossbar switches 44 and 46 are both assigned to the number one student booth, the number two hold columns of both the crossbar switches are assigned to the number two student booth, etc. And, accordingly, each output line 52 is connected with and used by a specific one of the student booths. Further, each of the two output lines 52, 52 one from each crossbar switch, which are assigned to a particular student booth are connected to a common line 53, and as explained in more detail hereinafter, for each student booth only one of its two assigned hold columns make a cross-point connection at any one time, the line 53 therefore receiving the program signals from the line 52 of the one hold column having the closed cross-point contacts.

As part of the switching mechanism further exclusively assigned to each student booth, the illustrated system, also includes a means for selectively connecting one of the group of 10 program signals appearing on the associated line 53 to the associated headphones 20. As shown, this means comprises a plurality of relay trees, 54, 54, each assigned to an associated booth. Each relay tree 54 has as an input thereto the 10 programs appearing on the associated crossbar switch output line 53 and has an output line 22 on which appears a selected one of the 10 programs, which selected program is transmitted to the associated headphone 20 by the line 22.

The select coils of the crossbar switches 44 and 46 are energized by three hundreds units 56, 58 and 60 in turn controlled by the binary coded signals appearing on the 10 output lines 42, 42 of the decoder 37. Since the number of available programs exceeds 100, each such program has a three digit number assigned to it and the program selecting stage of the program cycle involves operating in sequence the correspondingly numbered buttons 26, 26 of the Touch-Tone pad 24 temporarily tied to the switching mechanism through the operation of the line finder. That is, if the number of the desired program is 235, the number two, the number three and the number five buttons of the touch-tone pad are depressed in sequence in order to make a request for this program. The operation of the three hundreds units 56, 58 and 60 is such that if the first digit of the requested program is a one, the first hundred unit 56 is conditioned to receive the next digit signal and to energize one of its associated select coils in accordance with such second received signal. If the first digit of the requested program is a two, then the second hundred unit 58 is conditioned to accept the next appearing digit signal and to energize one of its associated select coils in accordance therewith. Similarly, if the first digit of the requested program is the digit three, then the third hundred unit 60 is conditioned to accept the next digit signal and to energize one of its associated select coils in accordance therewith. The first hundred unit 56 has 10 output lines, represented for convenience by the single line 62, each connected to a respective one of the first 10 select coils of the crossbar switch 44. The second hundred unit 58 also has 10 output lines, represented by the single line 64, each respectively connected to one of the last two selected coils of the crossbar switch 44 and the first eight select coils of the crossbar switch 46. The third hundred unit 60 has four output lines, represented by the single line 66, connected respectively to the last four select coils of the crossbar 46.

Assuming again, for example, that the program number of the requested program is 235, and that the touch-tone pad 24 of student booth No. 1 has been connected with the common switching equipment by a first press of one of its buttons 26, 26 and the subsequent action of the line finder 33, the program selecting stage is initiated by pressing the number 2 button which produces a corresponding signal from the decoder 37. The receipt of this signal from the decoder causes the second hundred unit 58 to be conditioned to receive the next output signal from the decoder.

The number three button of the Touch-Tone pad is then pushed and produces a corresponding signal from the decoder. This latter signal causes the second hundred circuit to energize the third one of its associated group of select coils, which happens to be the number one select coil of the crossbar switch 46. This in turn conditions the latter crossbar switch 46 to connect the number one of its input groups of program signals to the output line 53 of the student booth No. 1. This connection is made when the No. 1 hold coil of crossbar switch 46 is energized, but this energization does not take place until after the receipt of the third and last digit signal.

Before considering the next push of a button it should be noted that another part of the system is a unit or circuit indicated at 68 in FIG. 1B and referred to as a reset circuit. This reset circuit similar to the line finder 33, touch-tone receiver 36 and decoder 37 is used in common by all of the student booths 21, 21 and especially with that one student booth which at the moment is tied to the switching equipment by the action of the line finder. The reset circuit 68 is connected with the crossbar switches 44 and 46, as hereinafter described in more detail. It is also connected to the output lines 42, 42 of the decoder 37 and to each of the relay trees 54, 54 of the various student booths by a multiconductor line 70. In response to the energization of one of the select coils of one of the crossbar switches 44 and 46, the reset circuit 68 functions to prevent further signals from the decoder 37 to operate the gate and select driver circuits 56, 58 and 60 and instead operates to convert the output of the decoder 37, as it appears on the output lines 42, 42, to a coded signal on the line 70 which is transmitted to the relay tree 54 of the student booth actively making the program selection to operate such relay tree. Actually, the coded signal appearing on the line 70 is transmitted simultaneously to all of the relay trees 54, 54 but only that one relay tree which is associated with the student booth making the program selection is gated to receive and make use of the signal, this gating of the relay tree being accomplished by an appropriate gate signal transmitted thereto on the line 72 from the associated student logic.

Therefore, returning to the assumed program selection stage in the process from the student booth No. 1, when the next button actuation is made of a coded signal is produced in response thereto by the reset unit and is supplied to the associated relay tree 54. This in turn operates the relay tree and causes it to select one of the 10 conductors of the associated line 53 and to connect such conductor through one or more pairs of closed contacts to the output line 22 connected to the associated pair of headphones. Also, in response to this operation of the relay tree, the two number one hold coils of the crossbar switches 44 and 46 are energized to complete the connection between the selected input group of program signals and the line 53, this energization taking place over the associated line 74. It will be particularly noted that both of the hold coils assigned to the student booth making the program selection are energized but despite this energization of both hold circuits, only one cross-point will be selected insofar as only one select coil of the 24 made available to each student booth by the two crossbar switches is energized at the time the hold coil is energized. That is, in the present example where the program number is 235, and the number one student booth is one making the program selection, as soon as the relay tree 54 of said booth is actuated by the receipt of the third program selecting digit signal, the hold coil number one of the crossbar 44 and the hold coil number one of the crossbar 46 are both energized. However, only the select coil number one of the crossbar switch 46 is energized at this time and, therefore, upon this energization of both the hold coils, only the cross-point represented by hold coil one and select coil one of the crossbar switch 46 is made. The making of this cross-point, as mentioned, connects the number one group of 10 input program signals to the crossbar switch 46, appearing on the input line 50, to be connected in one-to-one relationship to the 10 output conductors of the line 52 connected to the number one hold column of the crossbar switch 46. This group of 10 selected programs is, therefore, transmitted by the associated line 53 to the associated relay tree 54 which is conditioned by the third program selecting digit signal to select one of the 10 programs received thereby from the line 53 and to connect such received programs to the output line 22.

From the foregoing, it will be understood that upon the generation of the third digit of the program number by the active touch-tone pad 24, the associated hold coils and relay tree of the active student booth are operated to complete the connection of the associated headphones 20 to a selected one of the program signals produced by the master program source 48. Following this connection, and in response to the energization of the hold coils, a signal is produced which frees the line finder 33, and other parts of the switching equipment which are common to all of the student booths, for use with another calling student booth to allow a program selection to be made at such booth by manipulating its touch-tone pad 24. However, after the line finder is freed for such subsequent use with another calling student booth, the hold coils of the student booth which are made the above-described program selection remain energized and thereby maintain the connection of such student booth with the selected program signal. This connection is maintained for so long as desired by the student at the booth and until such student again pushes another button of the touch-tone pad 24. In response to this last push of a button of the touch-tone pad, the associated student logic unit 29 is conditioned to remove the hold coil energizing signal from the associated line 74, thereby opening the previously closed cross-point connections and breaking the connection between the headphones and the selected program, and all other parts of the system individual to the booth in question are at this time conditioned to be ready for a new program cycle originating from said booth.

Detailed Description of the Construction and Operation of the System—FIGS. 2A to 2F Reference is now made to the single schematic diagram obtained by combining FIGS. 2A through 2F for a more detailed description of the construction and operation of the system of FIGS. 1A and 1B. In this diagram, only one student booth 21, namely the student booth No. 1 of FIG. 1A, and its associated student logic 29 and relay tree 54 have been shown in order to simplify the diagram. It is, of course, to be understood that the entire system, however, comprises 10 such student booths, 10 such student logics and 10 such student relay trees connected as shown in FIGS. 1A and 1B. In the diagram of FIGS. 2A to 2F, the symbols indicated at 76, 76 represent connectors whereby one line from a component common to all of the student booths is connected to a group of similar lines from similar components each individually associated with one of the student booths. For example, in FIG. 2A, the busy tone generator 25 is shown constructed through the associated connector 76 to a line 78 of the student logic number one. The connector 76 also serves to connect the corresponding lines of the other nine student booth logics to the busy tone generator 25, the connector, therefore serving as a common point of connection for all such lines, and the same holds true for the other illustrated connectors 76, 76 each serving to connect ten lines from 10individual units to one line of a common unit.

Figure 2A:
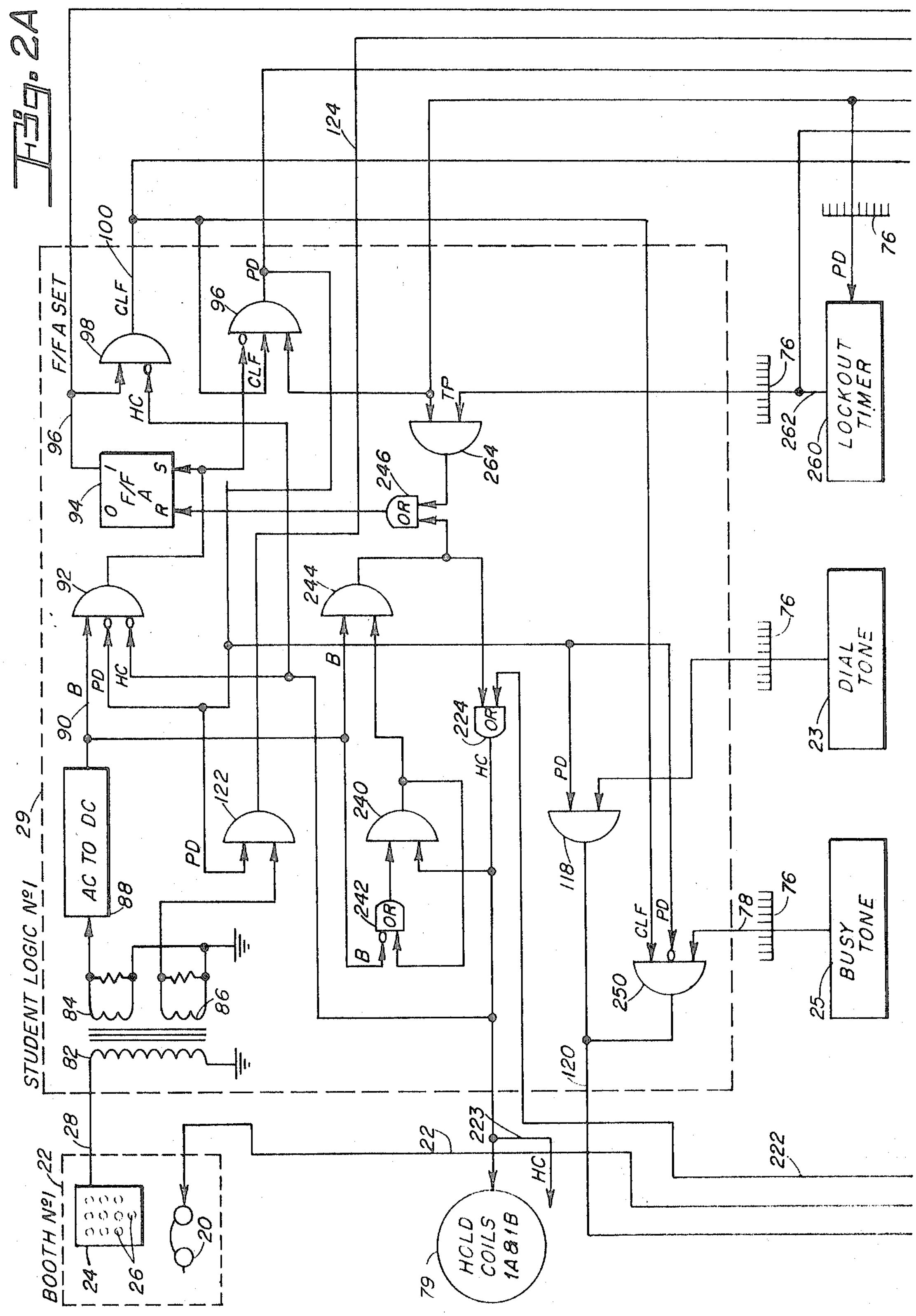
FIG. 2A, FIG. 2B, FIG. 2C, FIG. 2D, FIG. 2E and FIG. 2F taken together form a block diagram showing schematically and in greater detail the construction and arrangement of the system of FIG. 1.
Figure 2B:
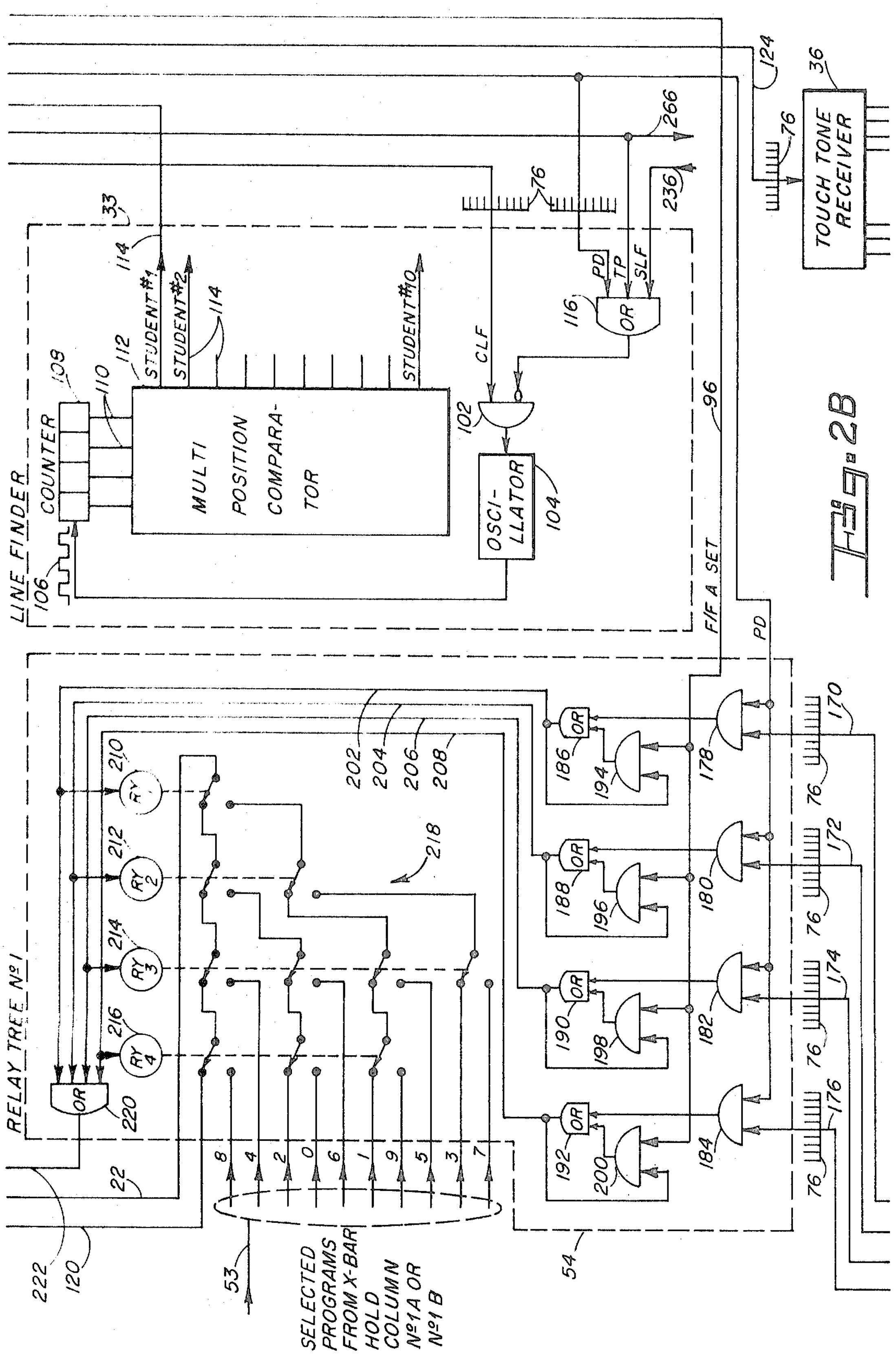
Figure 2C:
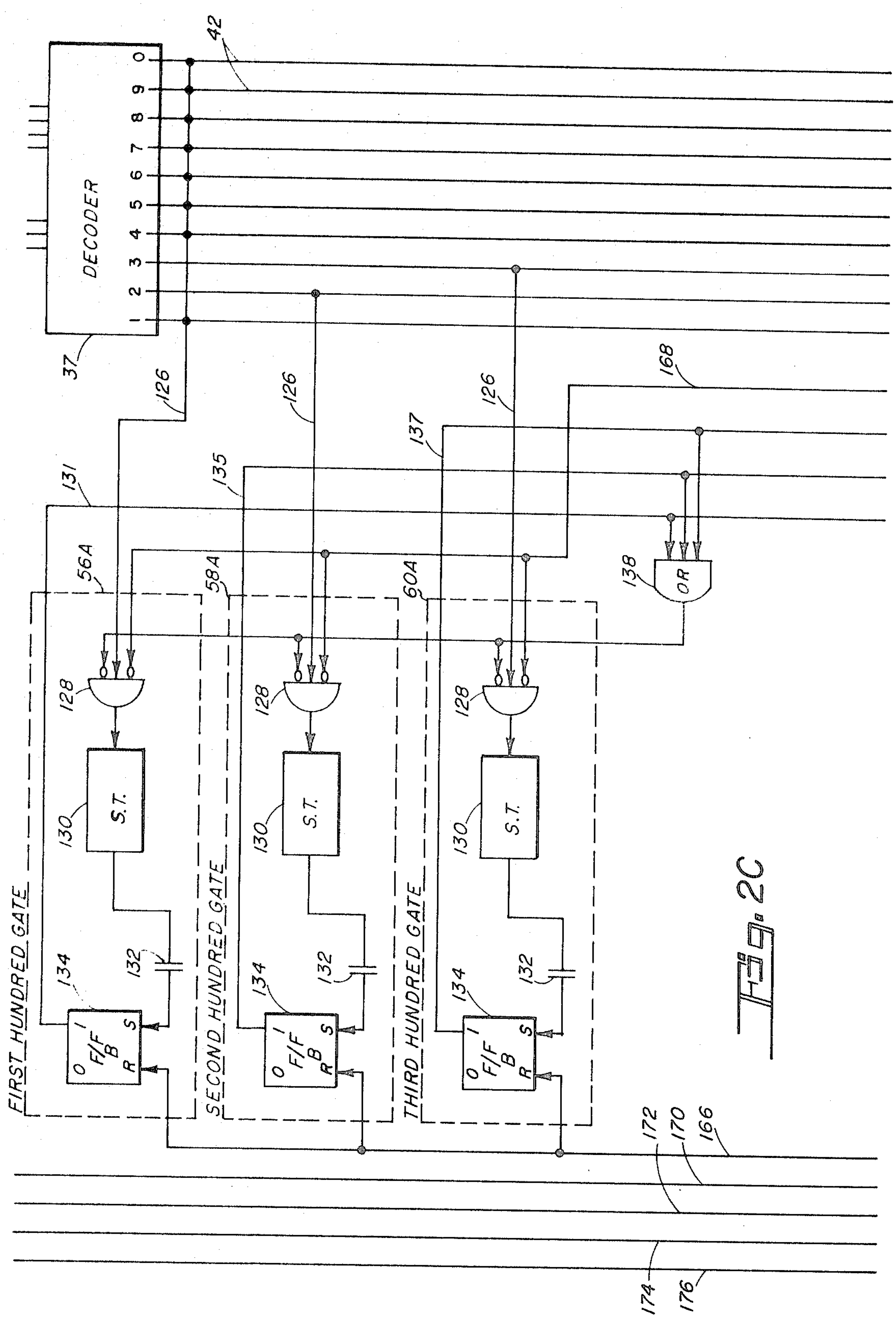
Figure 2D:
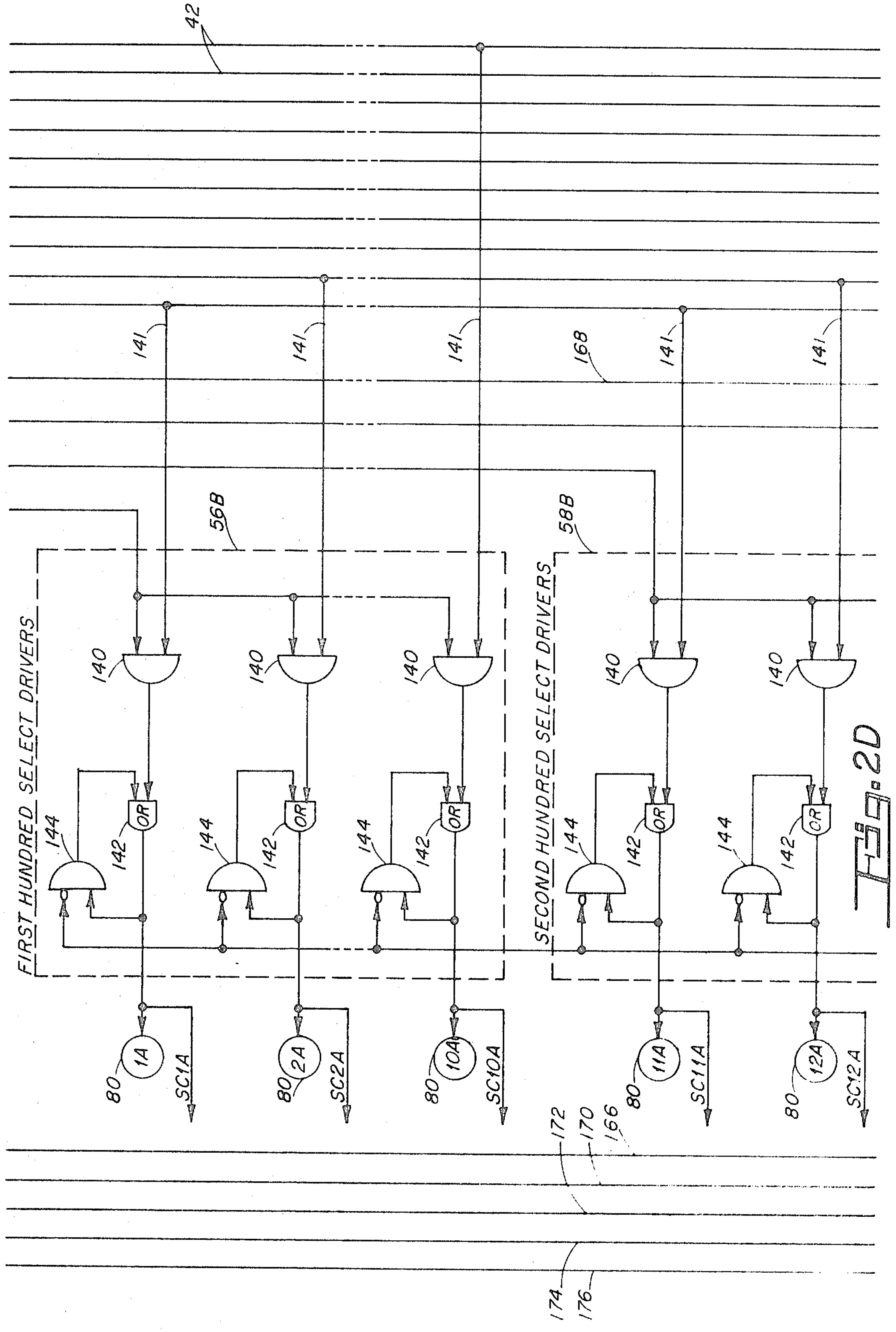
Figure 2F:
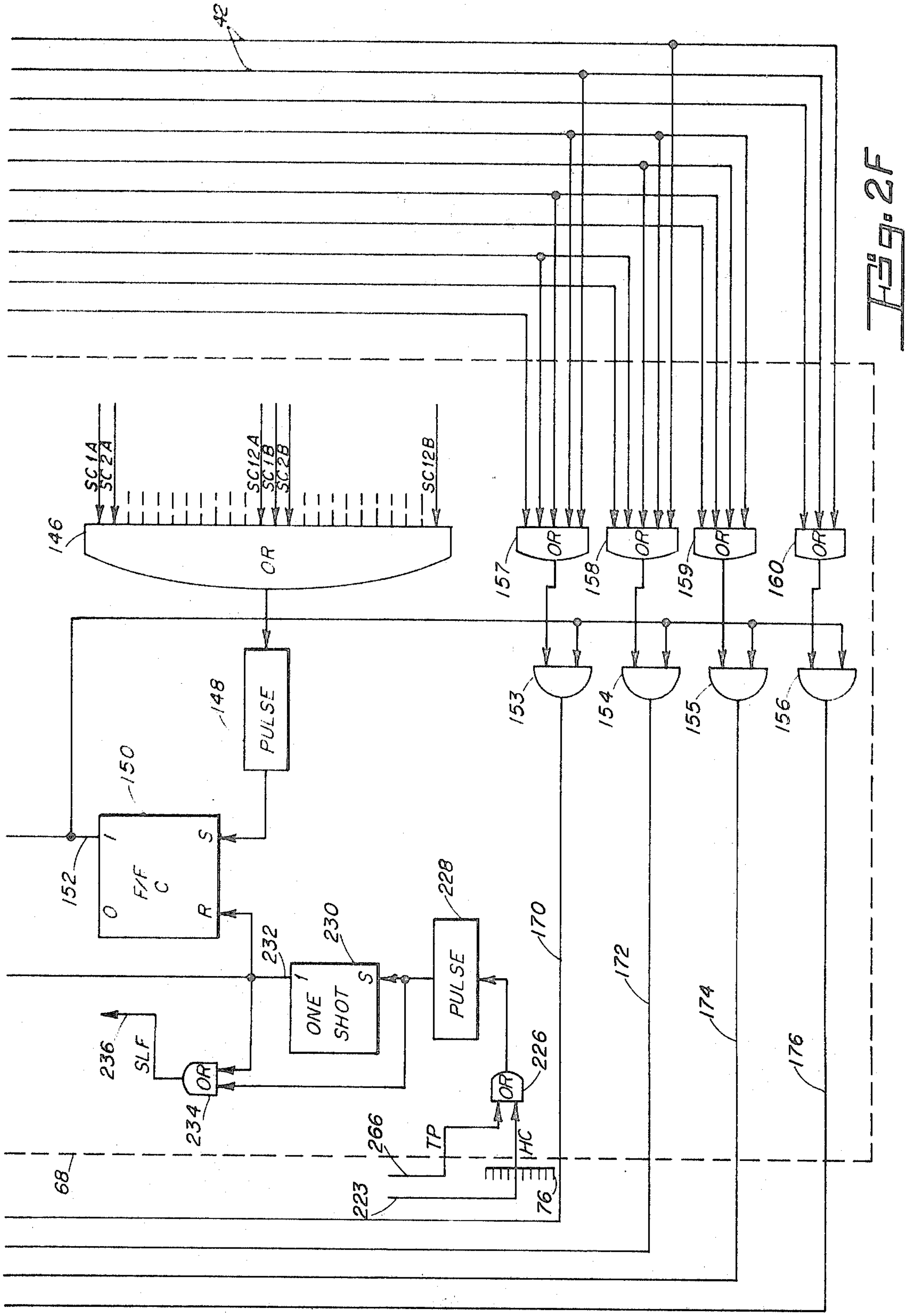
Figure 2E:
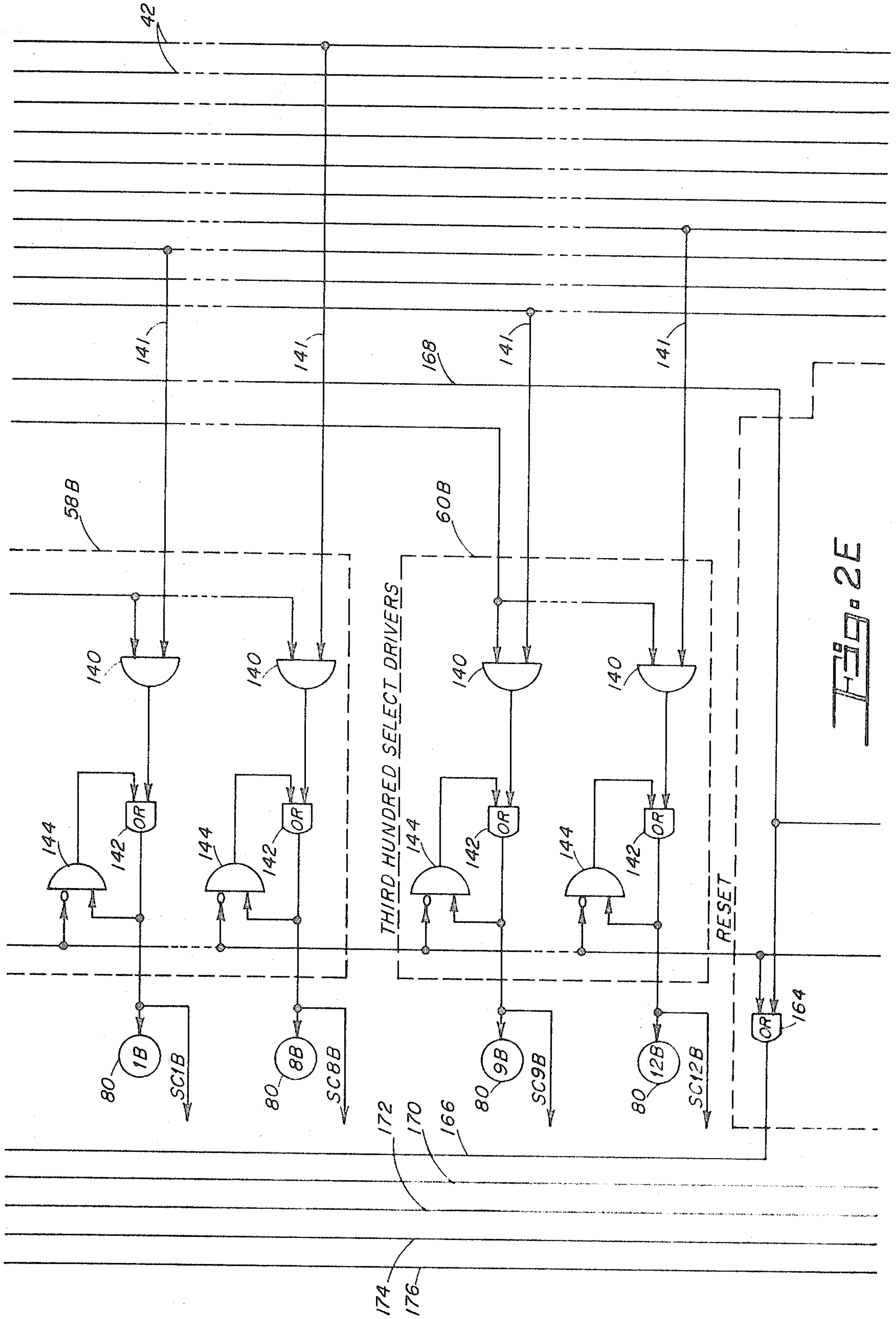

In the diagram of FIGS. 2A to 2F, the mater program source 48 and the major portion of the crossbar switches 44 and 46 have been omitted as these parts may be of generally conventional construction. Instead, only the two hold coils associated with student booth No. 1 have been indicated at 79 and designated hold coils 1A and 1B, these hold coils being hold coil number one of the crossbar switch 44 and hold coil number one of the crossbar switch 46 and being connected together as shown in FIG. 1B for energization and deenergization in unison. Also, the level select coils of the two crossbar switches 44 and 46 of FIG. 1B are shown in the more detailed diagram of FIGS. 2A to 2F at 80, 80 but for the sake of brevity only nine of these coils, and their associated gate and driver circuits, have been shown. In the designations applied to the illustrated select coils 80, 80, the numeral designates the number of the coil as it appears in FIG. 1B and the letters A and B designate the particular one of the two crossbar switches of which it is a part, the letter A designating the crossbar switch 44, and the letter B designating the crossbar switch 46. Therefore, for example, it will be understood that the illustrated select coil 80 designated 1A represents the number one select coil of the crossbar switch 44 of FIG. 1B. Also, in the more detailed diagram of the FIGS. 2A to 2F, the illustrated line 53 is the same as the line 53 of FIGS. 1A and 1B which connects the relay tree of student booth No. 1 to the output terminals of both of the number one hold columns of the two crossbar switches 44, 46, this line, as shown, in the more detailed diagram consisting actually of 10 separate conductors of each of which appears a single one of a group of 10 program signals selected from the master program source by the operation of the crossbar switches. The numbers appearing on these individual conductors in FIG. 2B represent the last digit of the program number of the program signal appearing on each line.

In the detailed diagram of FIGS. 2A to 2F, the basic blocks or subassemblies of the system are shown enclosed in broken lines and are designated by the same reference numerals as in the diagram of FIGS. 1A and 1B. Most of the components of these blocks are shown in turn in terms of simple logic symbols and constitute AND and OR gates the actual construction of which will be readily apparent to one skilled in the art. As to the AND and OR gates the small circles appearing at some of the inputs thereto represent inverters for inverting the signal applied thereto.

The detailed construction and operation of the system of FIGS. 2A to 2F may be best understood be describing the operation of the complete system in response to the operation of the buttons 26, 26 of the illustrated touch tone pad 24 throughout a full program cycle. As mentioned above, a complete program cycle involves five different depressions or actuations of the buttons of the touch-tone pad. Generally stated, the first actuation of a button operates to tie the booth in question to the common equipment, the next three actuations make the actual program selection and tie the selected program signal to the headphones of the booth, and the fifth actuation breaks the connection with the selected program and resets the equipment to allow the touch-tone pad to be used in performing a new program cycle. The first and fifth actuations may involve actuation of any one of the 10 buttons of the touch-tone pad and the middle three actuations are made in accordance with the number of desired program. That is, if the desired program is program number 235, the buttons number two, number three and number five are pushed in sequence, as the three middle actuations, to obtain such desired program.

First Push of Button

Turning now to a consideration of the operation of the system illustrated in FIGS. 2A to 2F, and considering that at the moment in question the line finder 33 is free and not in use with another student booth, one of the 10 buttons 26, 26 of the touch-tone pad 24 is first pressed and produces a pair of coded tone signals on the associated output line 28. The output line 28 is connected to the primary winding 82 of the input transformer comprising part of the associated student logic 29, the transformer also including two secondary windings 84 and 86. At this time, the signal induced in the secondary winding 86 has no effect, but the signal induced in the primary winding 84 is transmitted to an AC to DC converter 88 which in response to the received input tone signals produces a steady DC signal on the output line 90 for so long as the actuated button 26 remains depressed, this signal for convenience being designated a B or button signal. The B signal from the converter 88 is transmitted to an AND-gate 92 which at this time is transmitted in an open condition by the other inputs supplied there to so that an output is produced therefrom which is transmitted to a flip-flop A, indicated at 94 and another AND-gate 96. This latter signal from the AND-gate 92 sets the flip-flop 94 and thereby produces an output signal on the line 96 for which convenience is referred to as a "F/FA set" signal. Therefore, even after the button of the touch-tone pad is released and the B signal removed, the flip-flop 96 remains set and the "F/FA set" signal is maintained. This latter signal is transmitted to an AND-gate 98 which at this moment is held in an open condition by its other input so that an output signal is produced on its output line 100, this signal being a call signal for the line finder and being designated for convenience a CLF signal.

The CLF Signal produced by the AND-gate 98 of the student logic 29 is transmitted to the line finder 33, and more particularly to an AND-gate 102 in the line finder. This latter AND gate is held at this time in an open condition by its other input so that, in response to the receipt of the CLF signal, a signal is produced at its output which is transmitted to an associated oscillator 104 to set the oscillator into operation. That is, the operation of the oscillator 104 is dependent on the output signal form the AND-gate 102, the oscillator being turned on when such output signal is present and being turned off when such output signal is absent. The oscillator when running produces a train of generally square wave output pulses, such as indicated at 106, which are transmitted to a counter 108. The counter 108 is a four position binary counter and has four output lines 110, 110 each associated with a respective one of the four stages of the counter and on which appears a signal representing the appearance or absence of a binary bit at the associated stage of the counter. The counter is further a recycling counter which after reaching its maximum count, begins counting again from zero and being a four position counter the maximum count thereof is equal to the decimal equivalent number 16 which is greater than the total number of 10 student booths served by the line finder. The counter therefore is capable of containing 16 different distinct counts or numbers which appear therein one at a time as it is shifted through a complete cycle of counts by the input pulses applied thereto. Of these 16 distinct counts, 10 of them are assigned to respectively associated ones of the student booths and the other six counts are unused. That is, of the 10 utilized counts one is assigned to the student booth No. 1, another is assigned to the student booth No. 2, etc. Connected with the output lines 110, 110 of the counter 108 is a multiposition comparator, indicated at 112, having 10 output lines 114, 114 each connected with a respective one of the student logic circuits. The multiposition comparator, as described in more detail hereinafter, operates to produce a coincidence indicating output signal on each line 114 when the count of the counter 108 is equal to the count assigned to such output line. For example, if the count assigned to the uppermost one of the illustrated output lines 114, 114, and which is connected to the student logic number one, is 0001, an output signal will be produced on this line when the count of the counter is likewise 0001.

After the output signal does appear on the line 114 connected with the student logic number one, this signal is transmitted to the AND-gate 96. The inputs to the AND-gate 96 in addition to the coincidence indicating signal from the line finder appearing on the line 114 includes the inverted form of the signal appearing from the AND-gate 92. At this time, the output of the AND-gate 92 remains present for so long as the actuated button of the touch-tone pad remains depressed and, therefore, so long as the button does remain depressed, the AND-gate 96 is held in a closed condition and no output is produced therefrom despite the receipt of a coincidence indicating signal from the line finder. This, as will be more evident hereinafter, prevents the line finder from stopping on the calling student logic while the button of the touch-tone pad which was pressed to produce the call signal remains depressed and this, in turn, prevents the possibility of the coded tone signals produced as a result of this first push of a button from being inadvertently transmitted to the switching equipment and being used as the first digit of the program number. However, after the button is released, the output of the AND-gate 92 vanishes and the AND-gate 96 is opened so that when the next coincidence indicating signal from the line finder is received thereby, an output signal is produced therefrom, this output signal being referred to as a proceed dial signal and being indicated on the diagram as a PD signal.

The PD signal from the AND-gate 96 is, among other things, transmitted to the line finder 33 and through an OR-gate 116 in the line finder to the AND-gate 102 and used in an inverted form. Therefore, when the signal from the OR-gate 116 does appear at the AND-gate 102, the AND-gate 102, is thereby closed, its output signal is removed and the oscillator 104 is stopped, this, in turn, stopping the counter 108 and causing the coincidence indicating signal produced by the multiposition comparator 112 to remain on the output line 114 of the student logic No. 1, and this situation will be maintained until the oscillator 104 is again operated. It should also be noted at this time that the signal from the OR-gate 116 which is at this time applied to the AND-gate 102 and holds it in a closed condition not only prevents the CLF signal from the student logic No. 1 from operating the oscillator 104 but also prevents the oscillator from being operated in response to any other CLF signals received from any other student logic. The line finder, therefore, is at this time exclusively assigned to the calling student logic No. 1 and is temporarily incapable of responding to any other calling student logic.

The PD signal produced from the AND-gate 96 at this time is also transmitted to the AND-gate 118 of the student logic and opens this gate to allow passage therethrough to the line 120 of the dial tone produced by the dial tone generator 23. The line 120 conducts the dial tone to the associated relay tree 54 where it passes through the illustrated four series connected normally closed sets of contacts of the four relays of the relay tree to the line 22 connected to the associated pair of headphones 20 of the student booth 21. Therefore, as soon as the AND-gate 118 of the student logic is opened by the PD signal, the dial tone is transmitted to the associated pair of headphones 20 to indicate to the student that the system is now ready to receive and act upon a program number as set up by three additional pushes of the button of the touch-tone pad.

Second Push of Button

As mentioned above, the second, third and fourth pushes of the buttons of the touch-tone pad set up the program number, that is, if the number of the desired program is, for example, 235, the buttons number two, number three and number five are pushed in sequence as the second, third and fourth button actuations of the program cycle. Therefore, it will be understood that in the complete program cycle, the second push of the button establishes the hundreds digit of the program number, the third push of the button establishes the tens digit of the program number and the third push establishes the units digit of the program number.

Considering therefore now the second push of the button which establishes the hundreds digit of the desired program, and further assuming that the desired program number is 235, the number two button of the touch-tone pad 24 of booth No. 1 is now depressed. This in turn again produces two coded tone signals appearing on the output line 28 which pass through the primary winding 82 of the student logic transformer. A signal is now induced in the first secondary winding 84 and as a result thereof a B signal is produced from the AC DC converter 88, but this signal now has no effect since the AND-gate 92 to which it is applied is now held in a closed condition by the inverted form of the PD signal.

The PD signal, is, however, also applied to the AND-gate 122 so as to open the latter and allow to pass therethrough the corresponding tone signals generated in the secondary winding 86. The tone signals passing through the AND-gate 122 are transmitted to the touch-tone receiver 36 by the line 124. As mentioned hereinabove, the touch-tone receiver 36 acts in response to this received pair of coded tone signals to convert such tone signals to two simultaneous pulses of approximately 40 ms. duration, one appearing on one of the output lines 38, 38 and the other appearing on the one of the other output lines 40, 40. Each of the three output lines 38, 38 corresponds respectively to one of the three high frequency tones capable of being produced by the touch-tone pad and each of the four output lines 40, 40 corresponds to a respective one of the four low frequency tones capable of being generated by the touch-tone pad and those two lines on which the output signals simultaneously appear are those two lines corresponding to the frequencies of the pair of coded tone signals appearing on the line 124. The particular pair of output lines on which these output signals appear therefore establishes the identity of the button depressed in the touch-tone pad.

These Touch-Tone receiver output signals are, in turn, transmitted to the decoder 37 which detects the simultaneous signals received from the touch-tone receiver 36 and converts them into an output signal, again in the form of a pulse of about 40 ms. duration, appearing on the one output line 42, 42 corresponding to the touch-tone button represented by the touch-tone receiver output signals. Therefore, in this case, since the button actuated was the number two button, an output signal is produced by the decoder 37 on its number two output line 42. This output signal appearing on the number two output line 42 is transmitted to the second hundred unit 58.

At this time it should be noted that each of the hundreds units 56, 58 and 60 of the FIGS. 1A and 1B actually can consist of one gate circuit and a group of select driver circuits. In the more detailed diagram of FIGS. 2A to 2F the one gate circuit of the second hundreds is indicated at 58A and is shown separate from its associated group of select driver circuits which is indicated at 58B. The same separation and numbering scheme has also been applied to the gate circuits and groups of select driver circuits for the hundreds units 56 and 60.

The output signal appearing on the number two output line 42 of the decoder is accordingly seen to be transmitted to the AND-gate 128 of the second hundred gate circuit 58A. This gate 128 is opened at this time so that the signal applied thereto by the associated line 126 passes therethrough to a Schmitt trigger 130. The Schmitt trigger 130 in turn converts the pulse received from the line 126 to an improved square wave pulse of approximately 40 ms. duration which is differentiated by the associated capacitor 132 to produce shorter pulses of opposite polarity at the leading and trailing edges thereof the trailing one of which sets an associated flip-flop 134 identified as F/F B. When the flip-flop 134 of the second hundred gate 58A is so shifted to its set condition, an output signal is produced on its associated output line 135 which is transmitted through the OR-gate 138 to all three of the AND-gates 12, 128 of the three hundreds gate circuits, and it thereby closes said gates to prevent them from passing any subsequent signals from the decoder 37 as produced by the following second and third pushes of the buttons of the touch-tone pad. The output signal appearing on the output line 135 is also transmitted to all of the AND-gates 140, 140 of the second hundred group of select drivers 58B and thereby opens said latter AND-gates 140, 140 to condition them to receive the next signal appearing on the decoder output lines 42, 42.

From the foregoing, it should be noted that because the number two button was pushed to establish the first digit of the program number, the output pulse from the decoder appeared on the number two output line 42 and was transmitted to the second hundred gate 58A which in turn produced an output signal on its output line 135 transmitted to the second hundred group of select driver circuits 58B in turn conditioning said latter driver circuits to receive the next signal. If the number one button had been pushed, the output from the decoder would have appeared on the number one output line and it would have been transmitted to the first hundred gate 56A to produce an output signal on its output line 131 transmitted to the first hundred group of select driver circuits, conditioning said driver circuits to receive the next signal. Likewise, if the button pushed had been the number three button, the output signal from the decoder would have appeared on the number three output line 42 and would have been transmitted to the third hundred gate 60A to produce an output on its output line 137 transmitted to the third hundred group of select driver circuits 60B to condition such driver circuits to receive the next signal appearing on the decoder output lines. It should be noted that the input line 126 connecting the number one output line 42 of the decoder to the first hundred gate 56A is also connected to the number four, five, six, seven, eight, nine, and zero output lines of the decoder. Therefore, should any of the buttons representing the latter digits be pressed as a second push of the program cycle, it will be recognized as the digit one and will allow the remainder of the program selection process to be completed as though the first button pushed had been the number one button.

Third Push of Button

A third push of a button of the touch-tone pad of the number one student booth is now made to establish the second digit of the desired program number, this digit in the present case being assumed to be the digit three. As the number three button is so pushed, a coded pair of tone signals is produced by the generator of the touch-tone pad and transmitted over the line 28 to the transformer of the associated student logic 29 and a corresponding pair of tone signals is again induced in the second secondary winding 86 and transmitted through the now open AND-gate 122 to the touch-tone receiver over the line 124 to produce, from the decoder 37, an output pulse which appears on the number three output line 42 of the decoder. This output pulse has no effect on the third hundred gate 60A as its AND-gate 128 is now held in a closed condition by the signal applied thereto from the OR-gate 138 and emanating from the flip-flop 134 of the first hundred gate which was set, and still remains set, by the previous signal from the decoder establishing the hundreds digit.

The output pulse appearing on the number three output line of the decoder, is however, accepted by that AND-gate 140 of the second hundreds group of select drivers 58B which is connected to the number three output line 42 of the decoder by its input line 141. Although not all of the select driver circuits have been shown for reasons of brevity, it will be understood that the second hundred group of select drive circuits 58B comprises 10 separate driver circuits each associated with a corresponding one of the select coils of the crossbar switches and each having an input line 142 connected to a respective one of the 10 decoder output lines 42, 42. In the present case, the number three decoder output line 42 is connected, as far as the second hundred group 58B is concerned, with the driver circuit for the number 1B select coil 80 of the crossbar switches. Therefore, when the output now signal appears on the number three decoder output line, it is transmitted to the associated AND-gate 140, which is now in open condition, and passes through such AND gate to an OR-gate 142 and to another AND-gate 144. The AND-gate 144 is also at this time in an open condition so that an output is produced therefrom which is transmitted back to the associated OR-gate 142 to form a latching circuit holding the AND-gate 144 in a conducting condition and producing a continuous signal for energizing the associated select coil 1B which signal remains after the decoder output pulse has vanished.

This signal which energizes the select coil number 1B is in the diagram referred to as SC1B signal and in addition to being transmitted to the select coil is also transmitted to an OR-gate 146 in the reset unit 68. Signals produced by other ones of the select driver circuits for energizing other ones of the select coils are identified in accordance with the same scheme in the diagram. In the actual device the OR-gate 146 may conveniently consist of off-normal normally open sets of contacts, each associated with a respective one of the select coils, connected in parallel between an input line and an output line so that as soon as any one of the select coils is energized its associated set of off-normal contacts is closed to close a circuit between the input line and the output line and transfer the signal appearing on the input line to the output line.

Therefore, when the select coil is energized, a signal is also transmitted to the OR-gate 146 of the reset unit and an output is produced therefrom which is transmitted to a pulse forming circuit 148 which, in turn, produces a pulse transmitted to the associated flip-flop 150, referred to as F/FC, to shift the same to a set condition. This setting of the flip-flop 150 produces an output signal on the line 152 which is transmitted to four AND-gates 153, 154, 155 and 156 to hold them in an open condition relative to other inputs supplied thereto be respectively associated OR-gates 157, 158, 159 and 160. The four AND-gates 153, 154, 155, and 156 are respectively associated with the four relays of the relay tree 54 and the opening of these gates conditions them to selectively energize these relays in response to the next output signal appearing on the decoder lines 42, 42.

Before proceeding to the next push of the button, it should be noted that the setting of the flip-flop 150 as a result of the third button push also resets the set one of the flip-flops 134, 134 of the hundreds gates. More particularly, the output from the flip-flop 150 which appears on the output line 152 is transmitted to and through the OR-gate 164 to the line 166 and is transmitted by the line 166 to the reset terminals of the three flip-flops 134, 134 so as to reset that one of said three flip-flops which was in a set condition. The same output signal from the flip-flop 150 is also transmitted by the line 168 to the three AND-gates 128, 128 of the three hundreds gates and, therefore, holds these gates in a closed condition, despite the now reset condition of the previously set flip-flop 134, to prevent the next output signal appearing on the decoder output lines 42, 42 from having any influence on any of the three hundreds gates.

Fourth Push Of Button

The fourth push of the button establishes the units digit of the desired program number. Therefore, in the example under consideration, where the program number is 235, the number five button of the touch-tone pad 24 of student booth No. 1 is now pushed. The pushing of this button again causes the touch-tone pad to generate a pair of coded tone signals which are transmitted over the line 28 to the student logic transformer and induce corresponding signals in the secondary winding 86 which signals pass through the open AND-gate 122 to the touch-tone receiver and through the action of the touch-tone receiver and decoder 37 produce an output pulse on the number five output line 42 of the decoder. This output pulse has no effect on any of the hundreds gates insofar as the AND-gates 128, 128 of these hundred gates are now held in a closed condition by the signal applied thereto from the flip-flop 150 in the reset unit 68 over the line 168. Likewise, this output signal from the decoder has no effect on any of the select drivers insofar as all of the AND-gates 140, 140 of these circuits are now in a closed condition due to the absence of any signal applied to any of them from any of the three flip-flops 134, 134 of the three hundreds gates.

The number five output line of the decoder is, however, connected to both of the OR-gates 157 and 159 and, therefore, produces output signals from these OR gates transmitted to the AND-gates 153 and 155 which are now in an open condition because of the gating signal applied thereto from the flip-flop 150. Outputs are, therefore, produced from the two AND-gates 153 and 155 which are transmitted by the associated output lines 170 and 174 to two associated AND-gates 178 and 182 of the number one relay tree. These two AND-gates 178 and 182, as well as the other two similar AND-gates 180 and 184, of the illustrated relay tree are held in an open condition by the PD signal, applied to their other input terminals, which is present at this time and transmitted thereto from the associated student logic No. 1. The two signals appearing respectively on the two relay tree input lines 170 and 174 are also, through the associated connectors 76, 76, applied to the other nine relay trees of the other nine student booths, but they have no effect on such other nine relay trees as only the input gates 178, 180, 182 and 184 of the number one relay tree are at this time held in an open condition by the PD signal applied thereto by its associated student logic.

The signals passing through the AND-gates 178 and 182 from the relay tree input lines 170, 174 pass through associated OR-gates 186 and 190 and back to corresponding AND-gates 194 and 198 which, together with similar AND-gates 196 and 200 are, at this time, held in an open condition by a gating signal emanating from the flip-flop 94 of the associated student logic No. 1. The output signals from the AND-gates 194 and 198, are transmitted to the associated OR-gates 186 and 190 and, therefore, form latching circuits maintaining output signals from the OR-gates 186 and 190 for so long as the "F/F A set" signal remains on the line 96. The two continuous signals thus produced form the OR-gates 186 and 190 are transmitted by associated output line 202 to the relay coil 210 of the number one relay of the relay tree and by the line 206 to the relay coil 214 of the number three relay.

As shown, the relay tree 54 includes four relays having four relay coils 210, 212, 214 and 216 respectively and respectively associated sets of contacts indicated generally at 218 and connected to one another as shown. In the diagram the movable contacts of each relay are shown in their normal positions, that is, the positions occupied when the associated relay coil is unenergized, and it will be understood that when each of the relay coils is energized the contacts associated therewith are shifted to their alternate positions. The number of sets of relay contacts utilized and their interconnection are such as to provide a direct connection between the line 120 and the relay tree output line 22 when all of the relays are unenergized and to provide 10 other possible connections between the 10 conductors of the input line 52 which connections are made in response to the selective energization of one or more of the relay coils 210, 212, 214 and 216, the making of a connection between each of said 10 conductors and the output line 22 requiring a combination of relay coil energizations distinct from that required for any other connection. For example, in the assumed case where the relay coils 210 and 214 are energized, and the relay coils 212 and 216 left unenergized, a direction connection is made between the number five conductor of the input line 53 and the output line 22.

From the foregoing and by carefully noting the connection between the output lines 42, 42 of the decoder and the four OR-gates 157, 158, 159 and 160 of the reset unit 68, and the arrangement and interconnection of the contacts 218 of the four relays of the relay tree, it will be apparent that the operation of the system in response to the fourth push of the button is such that for whatever number button is pushed, the correspondingly numbered conductor of the input line 53 will be connected to the output line 22. That is, if the number one button is pushed, the number one conductor of the line 53 will be connected to the output line 22, if the number two button is pushed, the number two conductor of the line 53 will be connected to the line 22, etc.

The signals which appear on the relay energizing lines 202, 204, 206 and 208 are also transmitted to an OR-gate 220 of the relay tree and produce an output signal on the line 222 which is transmitted to and through an OR-gate 224 in the associated student logic 29 to produce a signal referred to as an HC signal which energizes the crossbar switch hold coils 79 assigned to the associated student booth No. 1, these being the number one hold coil of the crossbar switch 44 and the number one hold coil of the crossbar switch 46. As soon as these hold coils are energized, the contacts of the selected cross-point are closed, this in this case being the cross-point defined by the number one hold column and number one select level of the crossbar 46, to connect a group of 10 program input signals in one-to-one relationship to the 10 conductors of the associated line 53 and the one program which does appear on the number five conductor of the line 53 is transmitted through the contacts of the relay tree to the line 22 so that the program signal is transmitted to the associated headphones 20 of student booth No. 1 and reproduced by such headphones to produce an audible program capable of being heard by the student at the booth.

The HC signal produced when the hold coils are energized is also transmitted by line 223 to and through the OR-gate 226 of the reset unit 68 to a pulse forming circuit 228 which in response to the receipt of such signal produces an output pulse preferably of a duration of about 60 ms. This 60 ms. pulse is applied to a one-shot multivibrator which is triggered on the trailing edge thereof to produce an immediately following output pulse on its output line 232. The pulse from the one-shot multivibrator appearing on the line 232 is transmitted to the reset terminal of the reset flip-flop 150 and thereby resets the latter. It is also applied to all of the AND-gates 144, 144 of the three groups of hundreds select drivers and thereby closes that one gate 144 which was previously holding the energized one of the select coils 80, 80 energized, this in this case being the select coil 1B.

The HC signal produced in response to the energization of the hold coils 79 is also transmitted to the AND-gate 98 of the student logic and closes such gate to remove the line finder call or CLF signal and, in response to the removal of the CLF signal, to close the AND-gate 96 to remove the PD signal. The removal of the CLF signal from the AND-gate 102 of the line finder removes that signal from the first student booth tending to start its oscillator 104, and the removal of the PD signal removes that signal applied to the line finder from the first student booth tending to hold the AND-gate 102 closed and to stop the oscillator 104. The line finder oscillator, is however, held in a stopped condition for a short additional time to assure that all components of the system are in a stable condition before it is released for use with another calling student booth. This additional restraint is provided by the pulse from the pulse former 228 of the reset unit 68 and the pulse from the one-shot multivibrator 230 of the reset unit 68 which are applied to an OR-gate 234 and transmitted by the associated output line 236 to the line finder, the output signal from the OR-gate 234 being referred to as an SLF signal and having a duration equal to the duration of the two pulses from the pulse former 228 and one-shot multivibrator 230. Therefore, it will be understood that as soon as the SLF signal is removed, that is, when the one-shot multivibrator 230 reverts back to its stable state, no output is produced from the OR-gate 116 of the line finder 33 and, therefore, the line finder is totally released from student booth No. 1 and is free for use by any other calling booth, the AND-gate 102 being in an open condition at this time and ready to accept a CLF signal from any other student logic to start its oscillator in operation in hunt for the calling student logic.

The production of the HC signal upon the energization of the hold coils 79 also has the additional effect of setting the stage for the resetting of the flip-flop 94 of the student logic 29 in response to the next depression of a button of the associated Touch-Tone pad 24. More particularly, the HC signal from the OR-gate 224 of the student logic 29 is transmitted to and AND-gate 240 of the student logic. Another input to the AND-gate 240 is the output of an OR-gate 242 having as inputs thereto the output of the AND-gate 240 and the inverted form of the button signal B produced by the AC to DC converter 88. Therefore, as soon as the button which was pushed during the fourth button push is released, a signal is transmitted from the OR-gate 242 to the AND-gate 240 to open the same to the HC signal and when the HC signal is present, or thereafter appears, it produces an output from the AND-gate 240 which is both transmitted back to the OR-gate 242, to hold the AND-gate 240 open, and to another AND-gate 244 and holds the latter AND-gate 244 in an open condition. The action of the AND-gate 240 and OR-gate 242 is, therefore, such that as soon as the button is released at the end of the fourth button push and the HC signal appears, the AND-gate 244 is gated to an open condition and remains held in such open condition until the next push of the button as hereinafter described, this conditioning the flip-flop 94 for being reset by the next button push.

Fifth Push of Button

As above described, as a result of the fourth push of a button a selected program signal is connected from the master program source to the headphones of the illustrated student booth to provide an audible program at such student booth, and this program connection remains established until one of the buttons of the touch-tone pad 24 at the booth is again pushed, this being the fifth and last push of the complete program cycle.

When this fifth push of a button takes place, two coded tone signals are again generated by the touch-tone pad and transmitted to the transformer in the associated student logic, and corresponding signals are induced in the secondary windings 84 and 86. The tones induced in the secondary winding 86 now have no effect since the AND-gate 122 is held in a closed condition due to the absence of a PD signal applied thereto. The tone signals induced in the secondary winding 84, however, cause the AC to DC converter 88 to produce a B signal. This B signal is prevented from passing through the AND-gate 92 due to the presence of an HC signal at one of its illustrated inputs. The B signal is, however, also applied to the AND-gate 224 which as above described is now held in an open condition. An output is, accordingly, now produced from the AND-gate 244 which is transmitted to and through the OR-gate 246 to the reset terminal of the flip-flop 94 causing said latter flip-flop to be shifted to its reset condition and, thereby, removing the "F/F A set" signal from its output line 96. This removal of the "F/F A set" signal from the line 96 in turn closes the four AND-gates 194, 196, 198 and 200 of the associated relay tree 54 and, thereby, removes all of the energizing signals from the relay coils 210, 212, 214 and 216 causing all of the relays to be returned to their normal unenergized condition, breaking the connection with the selected program. This removal of the relay energizing signals also removes the output signal from the OR-gate 220 of the relay tree and removes one of the two signals applied to the OR-gate 224 of the student logic capable of holding the hold coils 79 in an energized condition. The other signal applied to the OR-gate 224 is the output signal from the AND-gate 244 which persists until the button is released at the end of the fifth push. Therefore, as soon as both the button is released and the relay tree relay coils are deenergized, the hold coils 79 are also deenergized thereby releasing the associated hold columns of the two crossbar switches 44 and 46.

At the end of this deenergization of the hold coils 79 of the No. 1 student booth, all of the components of the system which are exclusively associated with student booth No. 1 are in their normal reset condition and ready for use in making a new program selection, and in response to a new sequence of five button pushes of the touch-tone pad, the above sequence of events will be repeated, provided, however, that the line finder 33 is not at the time of the first button push tied to another calling student logic.

Operation with the Line Finder in Use

The above detailed description of the operation of the system illustrated in FIGS. 2A to 2F assumed that at the time of the first push of a button of the touch-tone pad that the line finder 33 and other common parts of the switching equipment were free and available for use with the illustrated student booth No. 1. This of course will obviously not always be the case and, therefore, let it be assumed now that when the first push of a button is made that the line finder is temporarily tied to another calling student booth as a result of its receiving a PD signal from such other calling student booth which through the OR-gate 116 holds the AND-gate 102 closed to prevent it from responding to a CLF signal produced by the student logic 29 of student booth No. 1.

When the first button is depressed in this instance, a CLF signal is produced from the output of the AND-gate 98, as described above, and transmitted to the line finder 33, but as mentioned, this CLF signal does not have any immediate effect on the line finder. This CLF signal is also applied to the AND-gate 250 which also has as an input thereto the busy tone provided by the busy tone generator 25. Another input to the AND-gate 250 is the inverted form of the PD signal, and the PD signal is not at this time present so that when the CLF signal does appear at the AND-gate 250, it opens the latter gate to allow the busy tone to pass therethrough to the line 120 by which it is transmitted to the relay tree 54 for passage through its now closed contacts to the output line 22 to produce a busy signal at the headphones 20 audible by the student. This busy signal indicates to the student that the switching equipment is not yet ready to receive the next three pushes of the button representing the program number, and until the busy tone disappears subsequent pushes of the buttons have no effect.

When the line finder 33 subsequently does become free for use with student booth No. 1, by the removal therefrom of all stopping signals applied to the OR-gate 116, the CLF signal produced by student logic No. 1 starts the oscillator 104 running to count up the counter 108 and produce an output signal on that line finder output line 114 assigned to student logic No. 1, when the count of the counter is that assigned to such student logic. This output signal in turn as previously described above, is transmitted to the AND-gate 96 and produces a PD output signal therefrom which stops the line finder and conditions the system for accepting further program selecting signals from the touch-tone pad. The PD signal produced from the AND-gate 96 is, however, also transmitted to the AND-gate 250 and closes such gate to remove the busy tone from the line 120. Simultaneously therewith it is also transmitted to the AND-gate 118 and opens said gate to transmit the dial tone to the line 120. Accordingly, therefore, as soon as the line finder does become tied to the calling student logic No. 1, the signal transmitted to the associated pair of headphones 20 over the line 22 is switched from the busy tone to the dial tone to indicate to the student that the system is now ready to accept further pushes of the buttons to make a program selection for student booth No. 1.

Operation of Lockout Timer

If a student at a student booth of the system described above were to operate his touch-tone pad to become connected with the switching equipment and were to then fail to complete a program selection by making all three button pushes required to set up the requested program number, then the line finder 33 and other common parts of the switching equipment would remain tied to this student booth and would remain unavailable for use with other student booths unless some means were provided to prevent this. In the illustrated system of FIGS. 2A to 2F such means is provided and constitutes primarily a lockout timer 260. This timer operates in response to a received signal, which is the PD signal from one of the student logics, to produce an output pulse on its output line 262 after the running of a given delay period from the start of the input signal, such delay period being, for example, 11 seconds.

The lockout timer is connected with the other components of the system, as shown in the detailed diagram of FIGS. 2A to 2F, and its operation may be understood by considering its function in the event no further button pushes occur after each of the first, second or third button pushes.

Consider first that the student at the illustrated booth 21 makes one push of one of the buttons 26 of his touch-tone pad and obtains a dial tone indicating that the common parts of the switching equipment have been assigned to his student logic, but thereafter fails to make any additional button pushes. At the end of the first button push, the flip-flop 94 has been set, the CLF and PD signals have been produced and the busy tone has been transmitted to the headphones of the student booth, all as described above in more detail. At the time the PD signal is produced from the AND-gate 96, which occurs at the instant the line finder is stopped, this signal is transmitted to the lockout timer 260 and starts its delay period. At the end of this delay period, approximately 11 seconds, an output pulse, referred to as a TP signal, is produced on the output line 262 and is transmitted to the AND-gate 264. This AND gate is at this time, held in an open condition by its other input from the comparator of the line finder and an output is produced from the AND-gate 264 which passes through the OR-gate 246 and resets the flip-flop 94. As soon as the flip-flop 94 is reset, the CLF and PD signals are removed by the closing of the AND-gates 98 and 96 and the removal of these two signals from the line finder 33 releases the line finder for use with other calling student booths. It should be noted, however, that the TP pulse from the lockout timer is also transmitted to the OR-gate 116 of the line finder and thereby prevents full release of the line finder until the termination of the TP signal, and the TP signal is of sufficient duration to assure that all components effected thereby have reached a stable condition before the line finder is released. Removal of the CLF signal from the AND gate also removes the busy signal from the headphones.

Assume next that the student at the student booth makes two pushes of the buttons of the Touch-Tone pad and then fails to proceed further. After the second button push, in addition to the flip-flop 94 being set, one of the flip-flops 134, 134 of one of the three hundreds gates 56A, 58A and 60A has also been set. At the end of the delay provided by the lockout timer 260, the TP pulse in addition to resetting the flip-flop 94 of the student logic as above described, is also transmitted over the line 266 to the reset unit 68, it is applied to the OR-gate 226 and through the action of the pulse forming circuit 228 and the one-shot multivibrator 230, produces an output from the multivibrator 230 which is transmitted to the OR-gate 164 and from the OR gate over the line 166 to the set one of the flip-flops 134, 134 to return such flip-flop to its reset condition. The system is, therefore, again returned to a normal condition at which the line finder and other common parts of the switching equipment are released from student booth No. 1 and in a condition for operation in association with another calling student booth.

Next assume that the student at student booth No. 1 makes three pushes of the buttons of the Touch-Tone pad and then fails to make any further pushes before the end of the lockout period. In this case, in addition to the flip-flop 94 of the student logic and one of the flip-flops 134, 134, of one of the hundreds gates being set as above described, the flip-flop 150 of the reset unit 68 is also set. Again, at the end of the 11 second delay period, the TP pulse is produced from the lockout timer, which in addition to resetting the flip-flop 94 also is transmitted to the reset unit 68, as above described and produces an output pulse from the one-shot multivibrator 230. This pulse in addition to resetting the set one of the flip-flops 134, 134 also is applied to the flip-flop 150 of the reset unit 68 and returns this flip-flop to a set condition. Therefore, again all common parts of the switching equipment are released from student booth No. 1 and returned to a condition for use with a subsequent calling booth.

Construction of Line Finder

Figure 3:
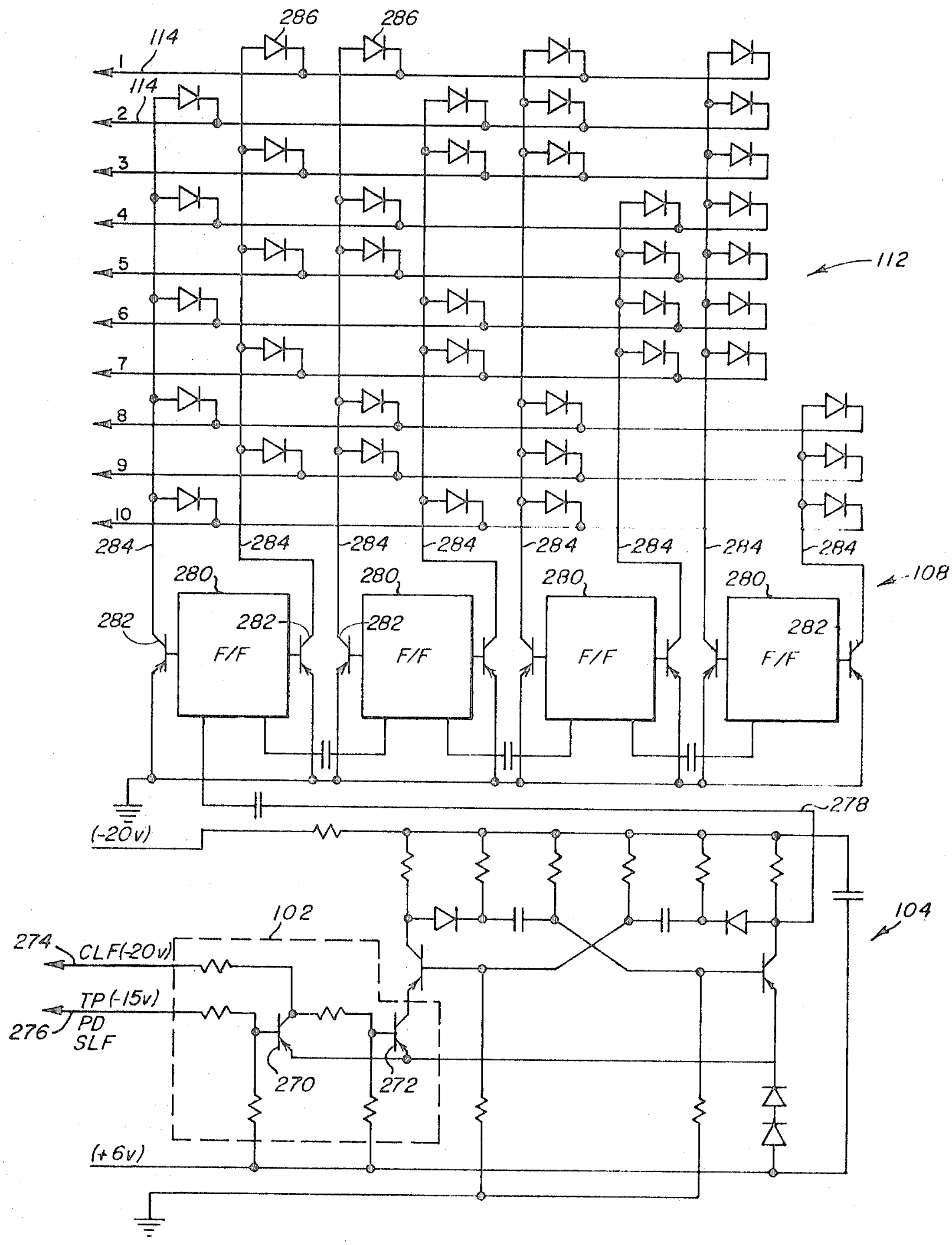
FIG. 3 is a wiring diagram showing the construction of the line finder of the system of FIGS. 1A and 1B.

All of the components shown in the diagram of FIGS. 1A and 1B and the more detailed diagram of FIGS. 2A to 2F, all are or may be of generally well-known construction and need not be described in detail. An exception to this, however, is the construction of the line finder 33 which is of a unique construction and which, therefore, is shown in more detail in FIG. 3. Referring to FIG. 3, the line finder as there shown includes, as also indicated in FIG. 2B, an oscillator 104, a counter 108 and a multiposition comparator 112. The oscillator 104 consists of a free running multivibrator circuit as shown. The AND-gate 102 which controls the oscillator 104 consists of two transistors, 270 and 272, and associated resistors connected as shown. The CLF signal received from a calling student logic appears on the line 274 and consists of a negative voltage, for example, −20 volts. The TP, PD or SLF signal appears on the line 276 and also consists of a negative voltage, for example, −15 volts. From consideration of the illustrated gate 102 it will be understood that when the CLF signal appears on the line 274 in the absence of a TP, PD or SLF signal on the line 276, the transistor 272 will be biased thereby to a convecting state to permit operation of the oscillator 104. However, when a TP, PD or SLF signal appears on the line 276, the transistor 270 will be biased to a conducting state, shorting out any signal appearing on the line 274 and, thereby, will prevent operation of the oscillator.

The output pulses produced by the oscillator 104 when it is running appear on its output line 278 and are applied to the first one of four cascaded flip-flops 280, 280 making up the counter 108 and operating in a conventional fashion. Associated with each of the counter flip-flops 280, 280 are two transistors 282, 282 which are switched between conducting and nonconducting states by the associated flip-flop, one of the transistors 282, 282 of each flip-flop 280 being in a conducting state and the other in a nonconducting state when the flip-flop is in one state, and each of such two transistors 282, 282 being switched to its opposite state of conduction when the flip-flop is switched to its other state.

The eight transistors 282, 282 controlled by the counter flip-flops 280, 280 comprise part of the multiposition comparator 112. The remainder of this comparator consists of a diode matrix having 10 output lines 114, 114 each of which, as shown in the more general diagram of FIGS. 2A to 2F, is connected to a respective one of the student logics 29, 29. The number at the left of each line 114 indicates the student logic booth to which it is connected. The matrix also includes eight other lines 284, 284 each connected to a respective one of the transistors 282, 282, and a plurality of diodes 286, 286 are connected between the various lines as shown. The interconnection of the lines 114, 114 and 284, 284 through the diodes 286, 286 is further such that each line 114 is connected to four diodes 286, 286, each of which through an associated line 284 is connected to one of the transistors 282 of each of the four flip-flops 280, 280.

The emitter terminals of all of the transistors 282, 282 are connected to ground and, therefore, each line 114 becomes ungrounded only when the four flip-flops 280, 280 are in such states that all of the transistors 282, 282 connected with that line are in nonconducting states, and this will occur at only one particular count throughout the full count cycle of the counter. The ungrounded signal which appears on a line 114 is the coincidence indicating signal referred to above in the more detailed discussion of the system, and from FIG. 3 it will be understood that the arrangement of the diodes 286, 286 is such that the production of an ungrounded signal on each of the lines 114, 114 requires a distinct counter count for each line so that only one line 114 is ungrounded at any one time and so that each line becomes ungrounded only once during each count cycle.

We claim:

1. A system for providing perceptible programs to a plurality of stations, said system comprising a program source providing a plurality of program signals, a plurality of pads each located at a respective one of said stations and each including a plurality of buttons and means for generating a coded tone signal in response to the actuation of each button, a plurality of reproducing means each located at a respective one of said stations for converting a received one of said program signals to a perceptible program, a plurality of means each associated with a respective one of said stations for producing a program call signal, a single converting means associated with all of said pads for converting said coded cone signals to binary coded signals, a plurality of switching means each associated with a respective one of said stations, each of said switching means being connected with said program source and with said reproducing means of said associated station and being operable by said binary coded signals to connect a selected one of said program signals to said latter reproducing means, a line finder means connected with all of said program call signal producing means and operable upon the receipt of a program call signal to connect the pad of a calling one of said stations to said signal converting means to the exclusion of all other of said pads, and means for transmitting the binary coded signals produced by said signal converting means to the one of said switching means associated with said one calling station to operate said latter switching means.

2. A system as defined in claim 1 further characterized by said generating means of each of said pads being such that each coded tone signal produced thereby in response to the actuation of an associated one of said buttons consists of a pair of simultaneous tone signals.

3. A system as defined in claim 1 further characterized by means connected with said plurality of switching means and with said line finder means for maintaining the connection between said pad of said calling one of said stations and said signal converting means and for preventing said line finder means from establishing connection of said signal connecting means with the pad of another calling station until said switching means of said one calling station is operated to complete the connection of one program signal to said reproducing means of said one calling station and responsive to the operation of said switching means of said one calling station to complete such connection to release said line finder means for use in making connection between said signal converting means and the pad of another calling station.

4. A system as defined in claim 1 further characterized by said line finder means comprising an oscillator for producing a train of output pulses, means connecting said oscillator to all of said call signal producing means and for turning said oscillator on when a call signal is received from any one of said call signal producing means, a recycling counter connected with said oscillator for counting said output pulses and having such a numerical capacity as to provide a plurality of mutually distinct counts each of which represents a respective one of said stations, a multiposition comparator connected with said counter and having a plurality of output lines each associated with a respective one of said stations, said comparator being operable to produce on each of said output lines an on-station signal only when the count of said counter is that which is representative of the associated station, a plurality of AND gates each associated with a respective one of said stations, each of said AND gates having an output connected to said signal converting means as an input to said signal converting means, means connecting each of said AND gates to the pad of the associated station so that said AND gate receives as one input thereto the coded tone signals produced by said latter pad, means connected with each of said output lines of said multiposition comparator and with the one of said AND gates associated with the associated station for producing as another input to said latter AND gate a proceed dial signal the existence of which is dependent on an on-station signal being present on said latter output line and which proceed dial signal is operable to open said latter AND gate to prevent the coded tone signals received thereby to pass therethrough to said signal converting means, and means connected to all of said proceed dial signal producing means and with said oscillator for inhibiting operation of said oscillator in response to the receipt of a proceed dial signal from any one of said proceed dial signal producing means.

5. A system for providing perceptible programs at a plurality of stations, said system comprising a program source providing a plurality of program signals divided into a plurality of groups, a plurality of first switching means each associated with a respective one of said stations and connected with said program source and operable in response to the receipt of binary coded signals to select one of said groups of program signals from said program source, a plurality of second switching means each associated with a respective one of said stations and connected with the associated one of said first switching means and operable in response to the receipt of binary coded signals to select one program signal from the group thereof selected by said associated first switching means, a plurality of reproducing means each located at a respective one of said stations and connected with the associated one of said second switching means for converting the one program signal selected by said second switching means to a perceptible program, a plurality of pads each located at a respective one of said stations, each of said pads including a plurality of buttons and means for generating a coded tone signal in response to the actuation of each button, a single signal converting means associated with all of said pads for converting said coded tone signals to binary coded signals, a plurality of means each associated with a respective one of said stations and operable by a person at said station for producing a program call signal, a line finder means connected with all of said call signal producing means and operable in response to said call signals to connect the pad of a calling one of said stations to said signal converting means so that the coded tone signals thereof are produced by manipulation of said latter pad are converted to binary coded signals, and means for transmitting the binary coded signals produced by said signal converting means to the first and second switching means of the said one calling station to cause said latter first and second switching means to direct one of said program signals to the reproducing means of said one calling station.

6. A system as defined in claim 5 further characterized by means connected with said plurality of first switching means and with said plurality of second switching means and with said line finder means for maintaining the connection between the pad of said calling one of said stations and said signal converting means and for preventing said line finder from establishing connection of said signal converting means with the pad of another calling station until the first and second switching means of said one calling station are operated to complete the connection of one program signal to said reproducing means of said one calling station and responsive to the operation of said first and second switching means of said one calling station to complete such connection to release said line finder for use in making a connection between said signal connecting means and the pad of another calling station.

7. A system as defined in claim 6 further characterized by a time delay means connected with said line finder and operable to release said line finder for use in making a connection between said signal converting means and the pad of another calling station at the end of the running of a predetermined time delay period starting at the time said pad of said one calling station is connected to said signal connecting means.

8. A system as defined in claim 5 further characterized by said plurality of first switching means comprising a crossbar switch having a plurality of select levels and a plurality of hold columns, each of said select levels including a plurality of input lines connected in one-to-one relationship to the input signals of a respective one of the groups thereof provided by said program source, and each of said hold columns including a plurality of output lines connected to a respective one of said second switching means.

9. A system as defined in claim 8 further characterized by each of said plurality of second switching means comprising a relay tree having a plurality of input lines connected to said output lines of the associated one of said hold columns of said crossbar switch and also having an output line connected to the reproducing means of the associated one of said stations.

10. A system as defined in claim 5 further characterized by each of said program call signal producing means comprising means connected with the associated one of said pads and responsive to the receipt of a tone signal therefrom to produce a program call signal.

11. A system as defined in claim 5 further characterized by each of said coded tone signals as produced by the actuation of one of said buttons of one of said pads consisting of two tone signals of different frequency and the frequency of each of which is one of a limited number of possible distinct frequencies, said limited number of possible distinct frequencies being smaller than the number of said buttons on one of said pads and each button of each pad being operable upon actuation to produce a pair of tone signals the combination of frequencies of which are different from the combination of frequencies of the two tone signals produced by the actuation of any other button of said pad, and said signal converting means comprising a receiver for receiving said pairs of tone signals and a decoder, said receiver having a number of output lines each corresponding to a respective one of said possible frequencies and including means for producing binary signals on said output lines representative of the presence or absence of the associated frequency in the pair of tone signals received thereby, said decoder being connected with said output lines of said receiver and having a plurality of output lines each corresponding to a respective one of the buttons on each of said pads, said decoder including means for converting said binary signals on said output lines of said receiver into binary signals on said output lines of said decoder representative of the actuation or nonactuation of the associated one of the buttons of the pads of said calling station.

12. A system for providing perceptible programs to a plurality of stations, said system comprising a program source providing a plurality of program signals, a plurality of reproducing means each located at a respective one of said stations for converting a received one of said program signals to a perceptible program, a plurality of means each associated with a respective one of said stations and each including a manually operable mechanism at the associated one of said stations for producing in response to the operation of said manually operable mechanism a call signal and program select signals, a selecting means associated with said program source and with said plurality of reproducing means operable in response to the receipt of program select signals to selectively connect selected ones of said program signals to said reproducing means, and means for exclusively assigning said selecting means to a calling one of said stations in response to the receipt of a call signal so as to permit the manually operable mechanism of the station assigned by said assigning means to said selecting means to be operated to in turn operate said selecting means and thereby make a program signal selection, said assigning means comprising an oscillator for producing a train of output pulses, a recycling counter for counting said output pulses and having such a numerical capacity as to provide a plurality of mutually distinct counts each of which represents a respective one of said stations, a multiposition comparator connected with said counter and having a plurality of output lines each associated with a respective one of said stations, said comparator being operable to produce on each of said output lines an on-station signal only when the count of said counter is that which is representative of the associated station, and gate means responsive to said on-station signals for gating to said selecting means only those program select signals which are produced by the one of said manually operable mechanisms associated with the station represented by the on-station signal produced by said multiposition comparator.

13. A system as defined in claim 12 further characterized by said manually operable mechanism at each of said stations comprising a pad including a plurality of buttons and means for generating a coded tone signal in response to the actuation of each button.

14. A system as defined in claim 12 further characterized by said assigning means including a plurality of AND gates each associated with one of said stations and each having as one input thereto the call signal produced by the manually operable mechanism of the associated station which signal opens each gate, each of said AND gates having as another input thereto the associated output line of said multiposition comparator so that when an on-station signal appears on said latter output line an output signal is produced from said AND gate and means responsive to said latter output signal for inhibiting operation of said oscillator.

15. A system as defined in claim 14 further characterized by means associated with each of said stations for maintaining the call signal originating therefrom until the associated manually operable mechanism has been operated to cause a selected program signal to be converted to the associated reproducing means, and means for terminating said call signal in response to the making of said latter connection.

16. A system for provided perceptible programs at a plurality of stations, said system comprising a program source providing a plurality of program signals divided into a plurality of groups, a crossbar switch having a plurality of select levels each operated by an associated one of a plurality of select coils and having as an input thereto a respective one of said groups of program signals from said program source, said crossbar switch also having a plurality of hold columns each operated by an associated one of a plurality of hold coils, said hold columns being assigned to a respective one of said stations and each having a plurality of output conductors on which appear in one-to-one relationship the input program signals of one of said select levels as selected by operation of the select coils of said one select level and the associated one of said hold coils, a plurality of relay trees each associated with a respective one of said stations and each having a plurality of input terminals connected in one-to-one relationship with the output conductors of the associated hold column of said crossbar switch, each of said relay trees further including an output terminal and a plurality of relays the contacts of which are so interconnected with one another and with said input terminals and said output terminal so that by energizing different combinations thereof different combinations thereof different ones of said input terminals may be selectively connected to said output terminal, a plurality of reproducing means each located at a respective one of said stations and connected with said output terminal of the associated relay tree, a plurality of means each associated with a respective one of said stations and each including a manually operable mechanism at the associated one of said stations for producing in response to the operation of said manually operable mechanism a call signal and program select signals, and means associated with all of said stations and operable upon the receipt of a call signal from a calling one of said stations to condition said manually operable mechanism of said calling one of said stations to operate said crossbar switch and the associated one of said relay trees in response to program select signals produced thereby to make a connection between one of the program signals of said program source and said reproducing means of said calling station.

17. A system as defined in claim 16 further characterized by said crossbar switch having its select levels divided into at least two groups, a plurality of gate circuits each associated with a respective one of said groups of select levels, a plurality of groups of select driver circuits each associated with a respective one of said gate circuits and each including a plurality of select driver circuits for operating a corresponding one of the select level coils of the associated gate circuit, means responsive to a first select signal from said manually operable means of a calling station to select one of said gate circuits, said gate circuit in response to said selection being operable to open the select driver circuits of its associated group of driver circuits, means responsive to the next program select signal for operating one of said select driver circuits of said selected group to operate its associated select level coil, means responsive to said operation of one select level coil for conditioning the associated relay tree of said calling station to receive the next program select signal from said manually operable mechanism, and means responsive to the energization said relay tree of said calling station for operating the hold coil of said crossbar switch assigned to said calling station.

18. A system as defined in claim 17 further characterized by means responsive to the energization of a hold coil of said crossbar switch to release said conditioning means for use with another calling station.

19. A system as defined in claim 18 further characterized by means associated with each of said stations for holding the associated hold coil of said crossbar switch in an energized condition following its energization until said manually operable mechanism of said calling station is again actuated, and means for deenergizing said latter hold coil upon such subsequent actuation of said manually operable mechanism.

20. A system as defined in claim 19 further characterized by said manually operable mechanism comprising a plurality of pads each located at a respective one of said stations and each including a plurality of buttons and means for generating a coded tone signal in response to the actuation of each button.

21. A system as defined in claim 20 further characterized by a single signal converting means associated with all of said pads for converting said coded tone signals to binary coded signals used to operate said crossbar switch and said relay trees, said conditioning means including means for transmitting said coded tone signals of the pad of said calling station to said signal converting means to the exclusion of similar signals from other ones of said pads.

22. A system providing perceptible programs to a plurality of stations, said system comprising a program source providing a plurality of program signals, a plurality of pads each located at a respective one of said stations and including a plurality of buttons and means for generating a coded tone signal in response to the actuation of each button, a plurality of reproducing means each located at a respective one of said stations for converting a received one of said program signals to a perceptible program, a single signal converting means associated with all of said pads for converting said coded tone signals to binary coded signal, a plurality of switching means each associated with a respective one of said stations, conditioning means responsive to a first push of one of the buttons of the pad of a calling one of said stations to connect the pad of said calling station to said signal converting means to the exclusion of all other of said pads, means responsive to the binary coded signals produced from said signal converting means as a result of the coded tone signals transmitted thereto in response to the next following series of pushes of the buttons of the pads of said calling station to operate said switching means of said calling station to connect a selected one of said program signals to the reproducing means of said calling station, and means responsive to the completion of said latter connection for releasing said conditioning means for use in connecting another one of said pads to said signal converting means.

23. A system as defined in claim 22 further characterized by said plurality of switching means comprising a crossbar switch having a plurality of hold columns each associated with a respective one of said stations.

24. A system as defined in claim 23 further characterized by said plurality of switching means further including a plurality of relay trees each associated with a respective one of said stations.

25. A system as defined in claim 23 further characterized by means responsive to a final push of the pad of said calling station for breaking the connection between the selected program signal and the reproducing means of said calling station.